United States Patent
Davis et al.

(10) Patent No.: US 9,191,399 B2
(45) Date of Patent: Nov. 17, 2015

(54) DETECTION OF INFECTED NETWORK DEVICES VIA ANALYSIS OF RESPONSELESS OUTGOING NETWORK TRAFFIC

(75) Inventors: Aaron R. Davis, Seattle, WA (US); Timothy M. Aldrich, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/610,537

(22) Filed: Sep. 11, 2012

(65) Prior Publication Data

US 2014/0075536 A1  Mar. 13, 2014

(51) Int. Cl.
G06F 9/00 (2006.01)
H04L 29/06 (2006.01)
G06F 15/16 (2006.01)

(52) U.S. Cl.
CPC .......... *H04L 63/1416* (2013.01); *H04L 63/145* (2013.01)

(58) Field of Classification Search
CPC .............. H04L 63/1416; H04L 63/145; H04L 12/2605; H04L 12/569; H04L 47/323
USPC .......................................................... 726/13
See application file for complete search history.

(56) References Cited

U.S. PATENT DOCUMENTS

| | | | |
|---|---|---|---|
| 6,772,348 B1* | 8/2004 | Ye | 726/13 |
| 7,953,984 B1 | 5/2011 | Chung et al. | |
| 2004/0233846 A1* | 11/2004 | Khandani et al. | 370/235 |
| 2005/0039104 A1* | 2/2005 | Shah et al. | 714/776 |
| 2006/0126522 A1* | 6/2006 | Oh | 370/250 |
| 2006/0168649 A1* | 7/2006 | Venkat et al. | 726/5 |
| 2006/0195896 A1* | 8/2006 | Fulp et al. | 726/11 |
| 2006/0212572 A1* | 9/2006 | Afek et al. | 709/225 |
| 2007/0025374 A1* | 2/2007 | Stefan et al. | 370/401 |
| 2007/0094491 A1* | 4/2007 | Teo et al. | 713/153 |
| 2008/0010225 A1* | 1/2008 | Gonsalves et al. | 706/11 |
| 2008/0028467 A1* | 1/2008 | Kommareddy et al. | 726/23 |
| 2008/0080518 A1* | 4/2008 | Hoeflin et al. | 370/395.42 |
| 2008/0256632 A1* | 10/2008 | Stockdell | 726/22 |
| 2008/0301798 A1* | 12/2008 | Hao et al. | 726/13 |
| 2009/0265777 A1* | 10/2009 | Scott | 726/11 |
| 2010/0050262 A1* | 2/2010 | Knapp et al. | 726/25 |
| 2011/0113490 A1* | 5/2011 | Wang et al. | 726/22 |
| 2011/0173490 A1* | 7/2011 | Narayanaswamy et al. | 714/4.11 |

(Continued)

*Primary Examiner* — Ashok Patel
*Assistant Examiner* — Gary Gracia
(74) *Attorney, Agent, or Firm* — Kunzler Law Group, PC

(57) ABSTRACT

The present disclosure describes one or more systems, methods, routines and/or techniques for detection of infected network devices via analysis of responseless outgoing network traffic. A computer implemented method may include executing a routine that receives as input first packet information. The method may include executing a routine that analyzes the first packet information to determine whether the first packet information identifies an outgoing network packet that is associated with the initiation of a network communication. The method may include executing a routine that causes storage and/or tracking, in one or more data stores, of the first packet information if the first packet information is determined to be a potential responseless packet. The method may include executing a routine that causes removal and/or ends tracking of the first packet information if the first packet information is determined to not be a responseless packet based on analysis of second packet information.

23 Claims, 9 Drawing Sheets

(56) References Cited

U.S. PATENT DOCUMENTS

| | | |
|---|---|---|
| 2011/0214157 A1* | 9/2011 | Korsunsky et al. ............... 726/1 |
| 2012/0210429 A1* | 8/2012 | Stute ............................... 726/23 |
| 2012/0246712 A1* | 9/2012 | Xie ................................. 726/14 |
| 2012/0272316 A1* | 10/2012 | Clevy et al. ..................... 726/22 |
| 2012/0311664 A1* | 12/2012 | Elrod et al. ....................... 726/1 |
| 2013/0097699 A1* | 4/2013 | Balupari et al. ................. 726/22 |
| 2013/0117849 A1* | 5/2013 | Golshan et al. ................. 726/23 |
| 2013/0298243 A1* | 11/2013 | Kumar et al. .................... 726/25 |

\* cited by examiner

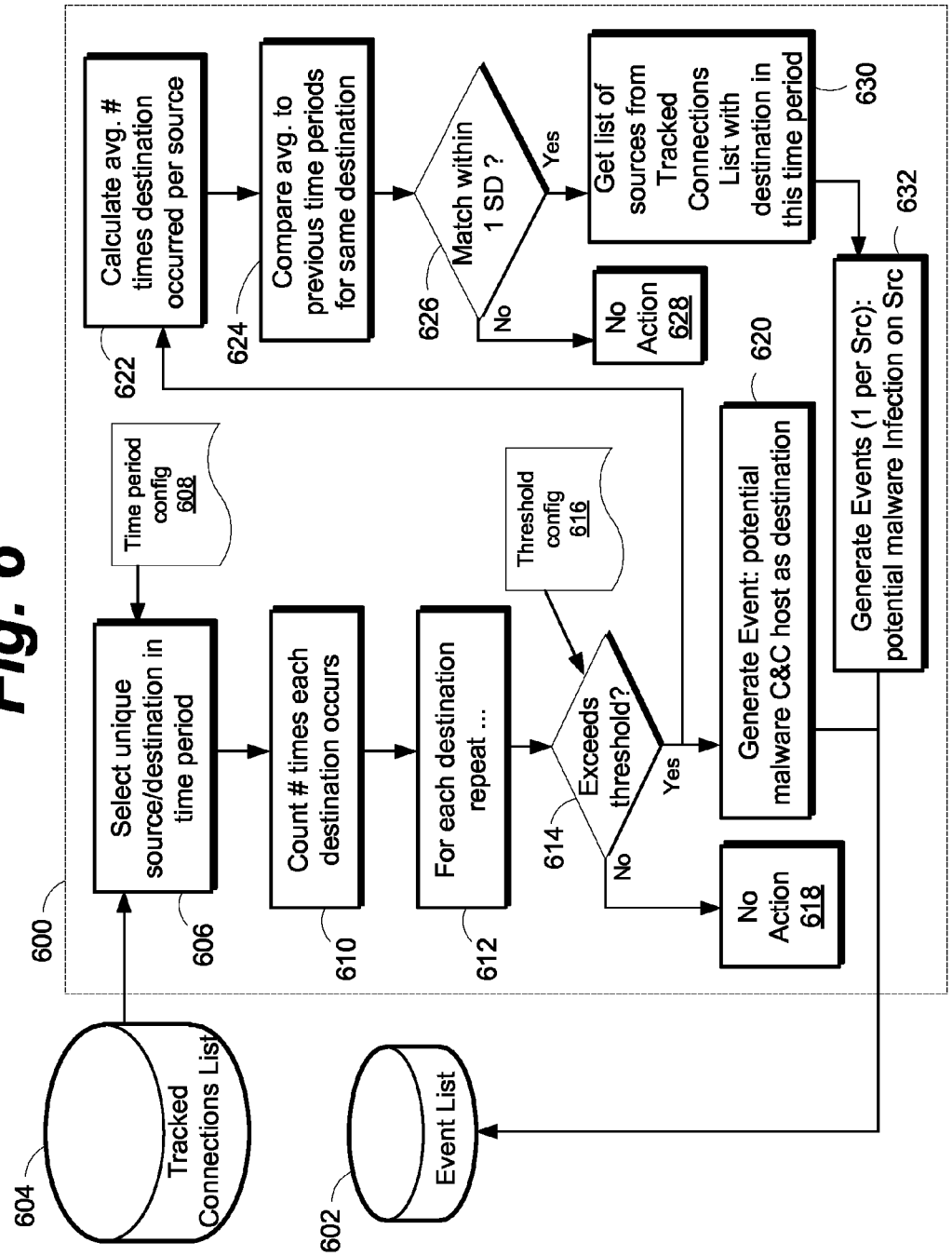

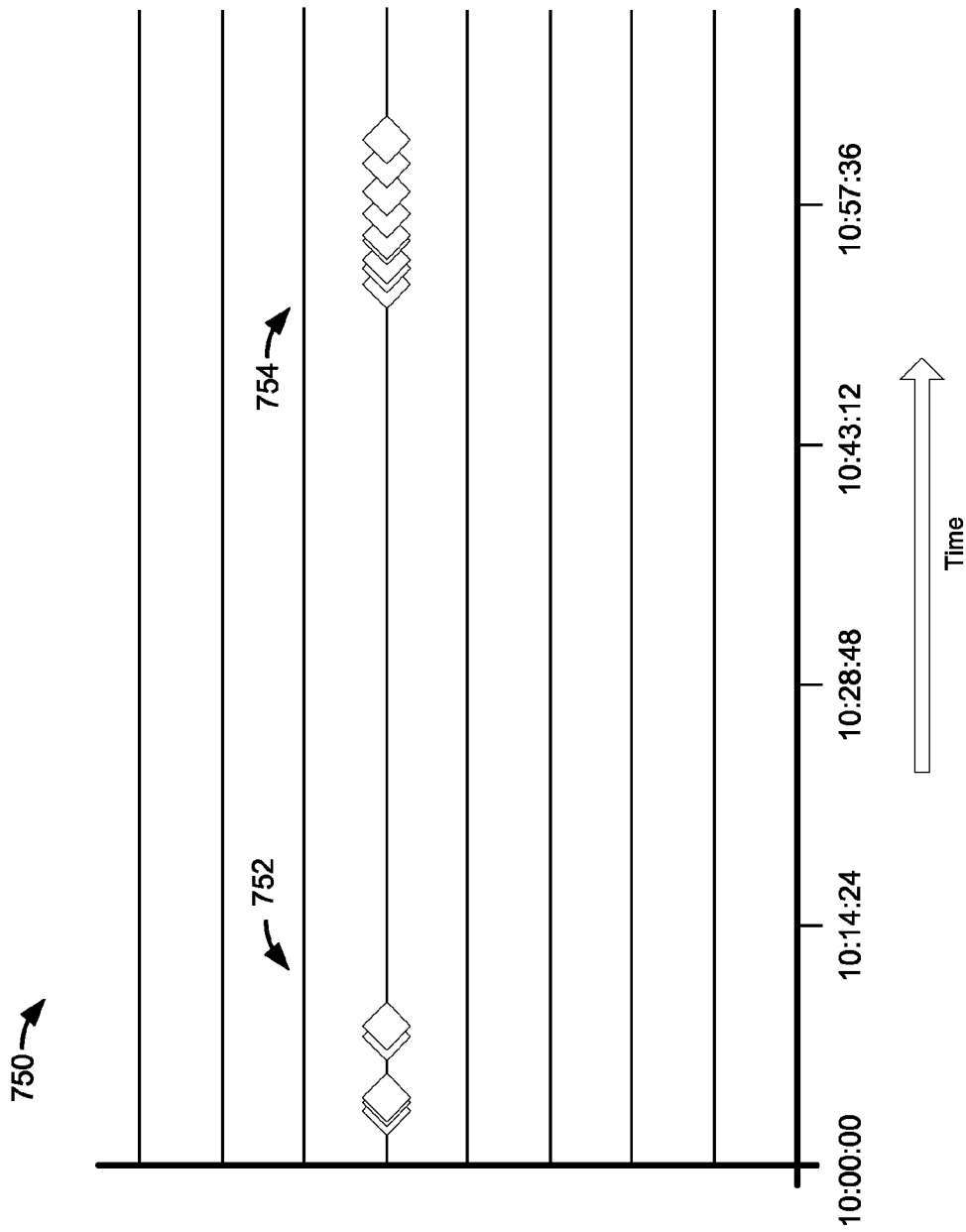

DETECTION OF INFECTED NETWORK DEVICES VIA ANALYSIS OF RESPONSELESS OUTGOING NETWORK TRAFFIC

CROSS-REFERENCE TO RELATED APPLICATIONS

None.

FIELD

The present disclosure relates to network security, and more particularly to one or more systems, methods, routines and/or techniques for detection of infected network devices via analysis of responseless outgoing network traffic.

BACKGROUND

With the wide spread use of computers, some misguided individuals and/or entities have employed a variety of techniques to spread malware to computers of unsuspecting users or entities. Malware generally refers to malicious, harmful and/or undesirable executables and/or data including computer viruses, spy programs, unsolicited advertisements, advertising executables, undesirable content and the like. Anti-malware programs are designed to detect and/or eliminate malware. Detection is typically accomplished by scanning files and folders on a user's computer using periodically updated malware definition files such as virus definition files. A malware definition file may indicate patterns that are suggestive of malware. By comparing the files on a user's computer with the malware definition files, some malware may be detected. If malware is detected in a given file, the file can be flagged for attention and/or may be repaired or deleted.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for detection of infected network devices via analysis of responseless outgoing network traffic. The systems, methods, routines and/or techniques of the present disclosure may be designed and/or adapted to detect various techniques used by attackers. One or more embodiments of the present disclosure may describe analyzing outgoing network packets that receive no response packet or no packet with a substantive response (i.e., responseless packets) to detect malware on a device and/or network.

One or more embodiments of the present disclosure describe a computer implemented method for network and/or device security. The method may execute on one or more computers (e.g., one or more firewalls) and may include a number of routines that are executed on one or more of the computers. The method may include a routine that receives as input first packet information. The method may include a routine that analyzes the first packet information to determine whether the first packet information identifies an outgoing network packet that is associated with the initiation of a network communication. The method may include a routine that causes storage and/or tracking, in one or more data stores, of the first packet information if the first packet information identifies an outgoing network packet that is associated with the initiation of a network communication, and if the first packet information is determined to be a potential responseless packet. The method may include a routine that receives as input second packet information. The method may include a routine that analyzes the second packet information to determine whether the second packet information identifies an incoming network packet that is in response to the outgoing network packet. The method may include a routine that causes removal and/or ends tracking, in the one or more data stores, of the first packet information if the second packet information identifies an incoming network packet that is in response to the outgoing network packet, and if the first packet information is determined to not be a responseless packet based on the second packet information.

In some embodiments, the first packet information and the second packet information may each be packet header information. In some embodiments, the first packet information and the second packet information may each be normalized packet header information that includes packet header information common to one or more packets over a period of time. In some embodiments, the step of analyzing the first packet information to determine whether the first packet information identifies an outgoing network packet that is associated with the initiation of a network communication may include analyzing the first packet information to determine whether the first packet information identifies an outgoing TCP network packet that is a SYN packet.

In some embodiments, the method may include a routine that analyzes the first packet information by comparing it to filter configuration data to determine whether the first packet information should be filtered out. In some embodiments, the method may include a routine that analyzes the first packet information to determine whether the first packet information identifies a network packet that is a retransmission of a previous outgoing network packet that was stored and/or tracked in the one or more data stores. In some embodiments, the method may include a routine that analyzes the second packet information to determine whether the second packet information identifies a network packet that is a packet indicating an error. In some embodiments, the method may include a routine that causes removal and/or ends tracking, in the one or more data stores, of packet information that has existed in the one or more data stores for a specified period of time. In some embodiments, the method may include a routine that receives as input, from the one or more data stores, packet information related to an outgoing network packet that has received no valid response packet within a period of time. The method may also include a routine that analyzes the packet information and generates one or more events that indicate that malware may exist in a network or on a device.

One or more embodiments of the present disclosure describe a computer implemented method for network and/or device security. The method may execute on one or more computers (e.g., one or more firewalls) and may include a number of routines that are executed on one or more of the computers. The method may include a routine that receives as input a plurality of pieces of packet information from network traffic. The method may include a routine that analyzes the pieces of packet information to identify outgoing network packets that receive no response packet during a period of time. The method may include a routine that causes storage and/or tracking, in one or more data stores, of packet information related to the outgoing network packets that have received no response packet. In some embodiments, the step of analyzing the pieces of packet information to identify outgoing network packets that receive no response packet during a period of time may include analyzing the pieces of packet information to identify outgoing network packets that are Dead-SYN packets.

In some embodiments, the method may include a routine that analyzes packet information, from the one or more data stores, to determine whether anomalies exist in the network traffic. The method may also generate one or more events based on the determination of whether anomalies exist in the network traffic, the one or more events indicating that malware may exist in a network or on a device. In some embodiments, the step of determining whether anomalies exist in the network traffic may include detecting anomalies that are indicative of Advanced Persistent Threats (APTs).

In some embodiments, the step of analyzing packet information from the one or more data stores to determine whether anomalies exist in the network traffic may include analyzing packet information to determine whether a particular source device has generated multiple outgoing network packets that received no response packet. In some embodiments, the method may include a routine that receives as input, from one or more data stores, a group of packet information that includes multiple pieces of packet information. Each of the pieces of packet information may be associated with a network packet and may include a source and a destination of the associated packet and a time indication. In some embodiments, the step of analyzing packet information from the one or more data stores to determine whether anomalies exist in the network traffic may include analyzing the group of packet information to determine a number of pieces of packet information in the group with the same source and destination, and determining whether the number of pieces of packet information with the same source and destination exceeds a threshold. In some embodiments, the number of pieces of packet information included in the group may be determined by comparing a time period configuration to the time indication of each piece of packet information such that a number of pieces of packet information are received over determined a period of time.

In some embodiments, the step of analyzing packet information from the one or more data stores to determine whether anomalies exist in the network traffic may include analyzing packet information to determine whether multiple source devices have been infected with the same malware. In some embodiments, the method may include a routine that receives as input, from one or more data stores, a group of packet information that includes multiple pieces of packet information. Each of the pieces of packet information may be associated with a network packet and may include a source and a destination of the associated packet and a time indication. In some embodiments, the step of analyzing packet information from the one or more data stores to determine whether anomalies exist in the network traffic may include analyzing the group of packet information to determine, for each destination, a number of pieces of packet information in the group for each unique source, and determining whether the number of pieces of packet information with each unique source, for a single destination, exceeds a threshold.

In some embodiments, the step of analyzing packet information from the one or more data stores to determine whether anomalies exist in the network traffic may include analyzing packet information to determine whether a source device is attempting to communicate with multiple destinations. In some embodiments, the method may include a routine that receives as input, from one or more data stores, a group of packet information that includes multiple pieces of packet information. Each of the pieces of packet information may be associated with a network packet and may include a source and a destination of the associated packet and a time indication. In some embodiments, the step of analyzing packet information from the one or more data stores to determine whether anomalies exist in the network traffic may include analyzing the group of packet information to determine, for each source, a number of pieces of packet information in the group for each unique destination, and determining whether the number of pieces of packet information with each unique destination, for a single source, exceeds a threshold.

In some embodiments, the step of analyzing packet information from the one or more data stores to determine whether anomalies exist in the network traffic may include analyzing packet information to determine whether a particular source device is attempting to communicate with a particular destination on a reoccurring basis. In some embodiments, the method may include a routine that receives as input, from one or more data stores, a group of packet information that includes multiple pieces of packet information. Each of the pieces of packet information may be associated with a network packet and may include a source and a destination of the associated packet and a time indication. Each of the pieces of packet information in the group may have the same source and destination. In some embodiments, the step of analyzing packet information from the one or more data stores to determine whether anomalies exist in the network traffic may include analyzing the group of packet information to determine, for each destination, a number of pieces of packet information in the group, and determining whether the number of pieces of packet information, for a single destination, exceeds a threshold.

In some embodiments, the step of analyzing packet information from the one or more data stores to determine whether anomalies exist in the network traffic may include analyzing packet information to determine whether a particular source device is attempting to communicate with a particular destination an average number of times over a time period that is about the same as averages over previous time periods. In some embodiments, the step of analyzing packet information from the one or more data stores to determine whether anomalies exist in the network traffic may further include determining, for the single destination, an average number of pieces of packet information in the group with the single destination per source; comparing the average number to a previous average number of a previous group of packet information; and determining whether the average number and the previous average number are about the same. The number of pieces of packet information included in the group may be determined by comparing a time period configuration to the time indication of each piece of packet information such that a number of pieces of packet information are received over determined a period of time.

In some embodiments, the step of analyzing packet information from the one or more data stores to determine whether anomalies exist in the network traffic may include analyzing packet information to determine whether a particular source device is generated repeating clusters of outgoing network packets that received no response packet. In some embodiments, the method may include a routine that receives as input, from one or more data stores, a group of packet information that includes multiple pieces of packet information. Each of the pieces of packet information may be associated with a network packet and may include a source and a destination of the associated packet and a time indication. The step of analyzing packet information from the one or more data stores to determine whether anomalies exist in the network traffic may include analyzing the group of packet information and, for each source, forming packet clusters for pieces of packet information having time indications that are relatively close to each other, and determining whether the time between the packet clusters is repeating.

In some embodiments, the step of analyzing packet information from the one or more data stores to determine whether anomalies exist in the network traffic may include analyzing packet information to determine whether a particular source device is attempting to communicate with a particular destination in repeating clusters. In some embodiments, the method may include a routine that receives as input, from one or more data stores, a group of packet information that includes multiple pieces of packet information. Each of the pieces of packet information may be associated with a network packet and may include a source and a destination of the associated packet and a time indication. In some embodiments, the step of analyzing packet information from the one or more data stores to determine whether anomalies exist in the network traffic may include analyzing the group of packet information and, for each source/destination pair, forming packet clusters for pieces of packet information having time indications that are relatively close to each other, and determining whether the time between the packet clusters is repeating.

One or more embodiments of the present disclosure describe a data processing system for network and/or device security. The system may include one or more communications units that are in communication with one or more networks, one or more memory units that store computer code, and one or more processor units coupled to the one or more communications units and the one or more memory units. The one or more processor units may execute the computer code stored in the one or more memory units to adapt the data processing system to receive as input a plurality of pieces of packet information from network traffic, analyze the pieces of packet information to identify outgoing network packets that receive no response packet during a period of time, and cause storage and/or tracking, in one or more data stores, of packet information related to the outgoing network packets that have received no response packet. The one or more processor units may execute the computer code stored in the one or more memory units to adapt the data processing system to analyze packet information, from the one or more data stores, to determine whether anomalies exist in the network traffic, and generate one or more events based on the determination of whether anomalies exist in the network traffic, the one or more events indicating that malware may exist in a network or on a device. In some embodiments, the data processing system may be a firewall.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIG. 6 depicts an illustration of a block diagram showing example components, routines, algorithms, configuration data and the like that may be found in a destination detector module, according to one or more embodiments of the present disclosure.

FIG. 7B depicts an illustration of a graph that shows example connections attempted by a source over time, as described in relation to one or more embodiments of the present disclosure.

DETAILED DESCRIPTION

Figure 1:
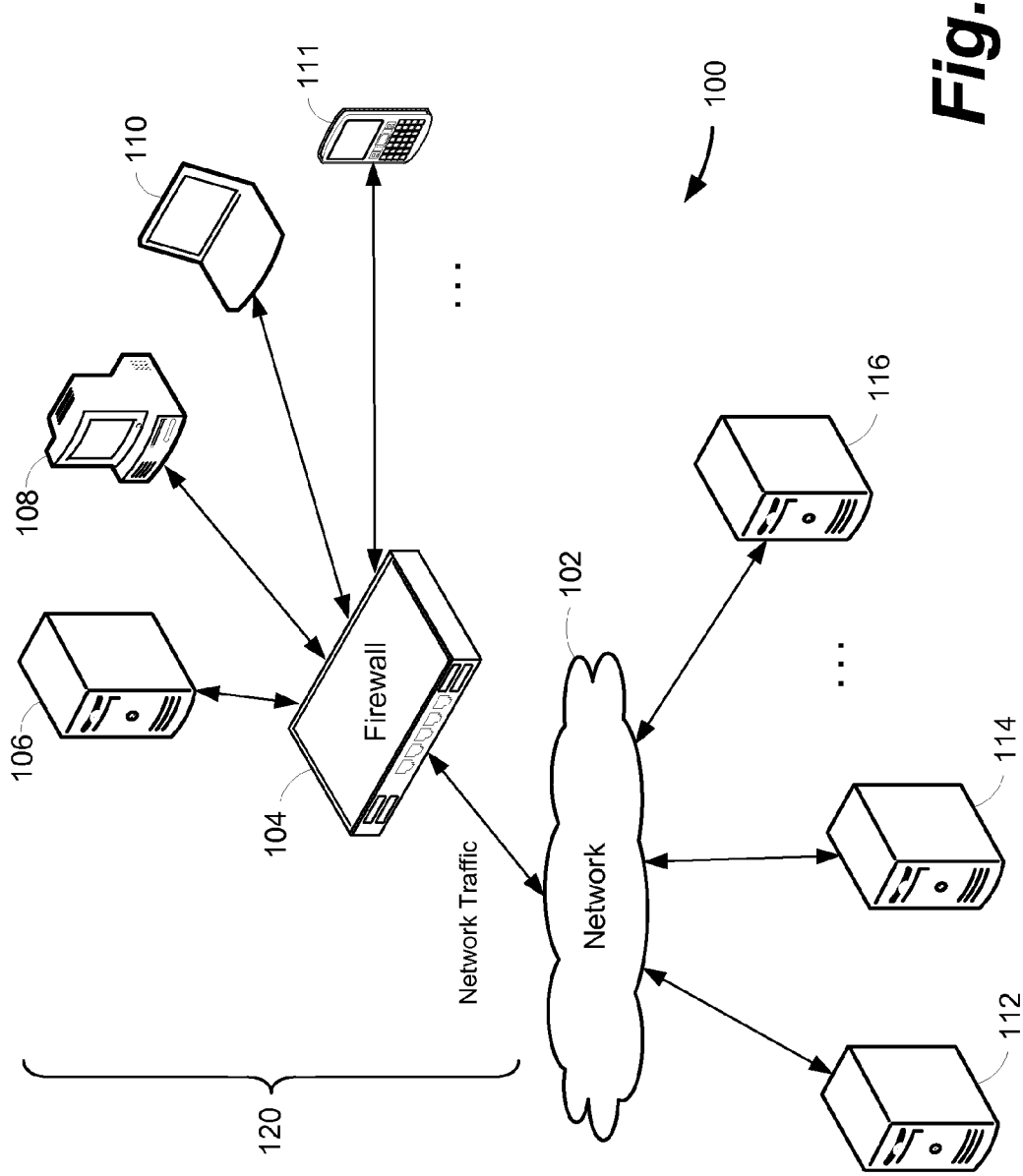
FIG. 1 depicts an illustration of a block diagram showing example components, connections and interactions of a network setup, where one or more embodiments of the present disclosure may be useful in such a network setup.

Various techniques are aimed at detecting and/or preventing malware attacks, but these solutions have proven ineffective to deal with various techniques used by attackers or hackers. According to one example technique used by attackers, malware sometimes referred to as Advanced Persistent Threats (hereafter "APT" or "APTs") infects a target machine by some entry mechanism and installs a software program that can perform actions for the attacker. After being installed, the APT may begin to "call out" or "beacon" to a host or list of hosts via a computer network, typically on a regular and recurring basis. A purpose of these callouts or beacons may be to bypass corporate or personal firewalls which tend to prevent most incoming traffic but allow most outgoing traffic. The software program may allow the attacker to instruct or control the victim device to carry out actions for the attacker, such as surveying other computing systems, collecting data from the infected device, and/or exfiltrating information back to the attacker. In order to make this beaconing technique effective, a server or IP address, for example controlled by the attacker, may be designated and saved by the malware program prior to infection so that the malware program can communicate with the attacker by sending outbound data. This server or IP address, or a list of servers or IP addresses, may be updated by the attacker in the future. For the malware program to function as intended, it generally needs to reach out to the attacker-controlled server or group of servers (commonly referred to as the Command & Control servers or C&C servers) on a regular interval so that control can be established and/or updates to the malware can be retrieved. For long periods of time, the attacker may keep the C&C server(s) off-line to prevent the servers from being compromised or shutdown by security firms. Therefore, the majority of beacon attempts may be unsuccessful because the C&C server(s) will not be online, and the requests will either be returned with error or will never return at all. Such beacon attempts may generally be referred to as being responseless (e.g., responseless outgoing packets and/or network traffic).

The present disclosure describes one or more systems, methods, routines and/or techniques for detection of infected network devices via analysis of responseless outgoing network traffic. The systems, methods, routines and/or techniques of the present disclosure may be designed and/or adapted to detect various techniques used by attackers, where detection may be performed without requiring signatures and/or fingerprints for recognized threats or knowledge about notoriously malicious IP addresses. The systems, methods, routines and/or techniques of the present disclosure may be designed and/or adapted to detect various techniques used by attackers, where detection may be performed without requiring significant amounts of human interaction or manual inspection to determine whether malware infection exists. The systems, methods, routines and/or techniques of the present disclosure may be designed and/or adapted to detect various techniques used by attackers, where detection may be performed by analyzing behavioral patterns that are common to particular categories of infections. The systems, methods, routines and/or techniques of the present disclosure may be designed and/or adapted to detect various techniques used by attackers, where detection may be performed during the malware "beaconing" phase (i.e., the time between infection and activation of the malware).

One or more embodiments of the present disclosure may describe analyzing outgoing network packets that receive no response packet or no packet with a substantive response (i.e., responseless packets) to detect malware on a device and/or network. The term responseless packet may refer to an outgoing network packet that receives no response packet or receives a packet with no substantive response, for example, merely a packet indicating a connection error. As one example, the term "Dead-SYN" may refer to a TCP synchronization (SYN) packet that receives no corresponding response packet (e.g., a SYN-ACK packet). As another example, a reset or RST packet may refer to a TCP packet that that indicates a connection error and may not indicate a valid response packet. One or more embodiments of the present disclosure may describe the use of responseless packet tracking (e.g., Dead-SYN tracking) to detect malware on a device and/or network, for example, Advanced Persistent Threats (APTs). One or more embodiments of the present disclosure may describe analyzing the quantity, periodicity, clustering and/or target destination of responseless packets (e.g., Dead-SYN packets). One or more embodiments of the present disclosure may describe alerting an operator, program, service or other entity to one or more conditions that may indicate the presence of malware. One or more embodiments of the present disclosure may describe using filters and/or control parameters to limit the number of false positive alerts.

It should be understood that the descriptions in this disclosure may apply to various communications protocols, for example, any communications protocol that sends an initial outbound packet or initial outbound traffic and expects some substantive response in return. Example communications protocols may be TCP, UDP, other routing protocols or any other communications protocol. It should be understood that although various descriptions in this disclosure may explain a specific protocol example, for example, the TCP protocol (and Dead-SYN tracking) example, in order to clearly explain the disclosure, the descriptions provided herein may apply to various other communications protocols and responseless packets.

FIG. 1 depicts an illustration of a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include a network 102, a firewall 104, a number of internal devices (for example, internal devices 106, 108, 110, 111) and a number of external devices (for example, external devices 112, 114, 116). The network 102 may be a medium used to provide communication links between various devices, such as data processing systems, and perhaps other devices. The network 102 may include connections such as wireless or wired communication links. In some examples, the network 102 represents a worldwide collection of networks and gateways that use the Transmission Control Protocol Internet Protocol (TCP IP) suite of protocols to communicate with one another. In some examples, the network 102 may include an intranet, a local area network (LAN) or a wide area network (WAN).

In the example shown in FIG. 1, the number 120 represents a portion of the network setup 100 that is "internal," meaning that it is behind a firewall or some other device or program that attempts to detect malicious activity on the network 102 and attempts to keep internal devices 106, 108, 110, 111 free from malware, viruses and the like. As one example, firewall 104 may be a corporate firewall, and internal portion 120 may be all or a portion of the devices that exist within a corporate internal network. Internal devices 106, 108, 110, 111 may be data processing systems, servers, printers, computers, laptops, smartphones, PDAs or any other like kind of device that may communicate with a network. External devices 112, 114, 116 may be data processing systems, servers, computers and the like that are designed and/or programmed to attack internal devices such as internal devices 106, 108, 110, 111.

One or more embodiments of the present disclosure may be run on a device that is located between internal devices 106, 108, 110, 111 and the network 102. For example, one or more embodiments of the present disclosure could be run on a firewall 104. Firewall 104 may be one or more data processing systems that are capable of being programmed to execute computer code that may execute one or more of the systems, methods, routines and/or techniques for detection of infected network devices via analysis of responseless outgoing network traffic. In some embodiments, one or more of the systems, methods, routines and/or techniques of the present disclosure may be designed as hardware, for example being disposed within one or more devices such as Firewall 104. In some embodiments, one or more of the systems, methods, routines and/or techniques of the present disclosure may be designed as a combination of hardware and software. In some embodiments, the systems, methods, routines and/or techniques of the present disclosure may be implemented using more than one firewall device. For example, one or more firewall devices may work together as a larger unit.

Figure 2:
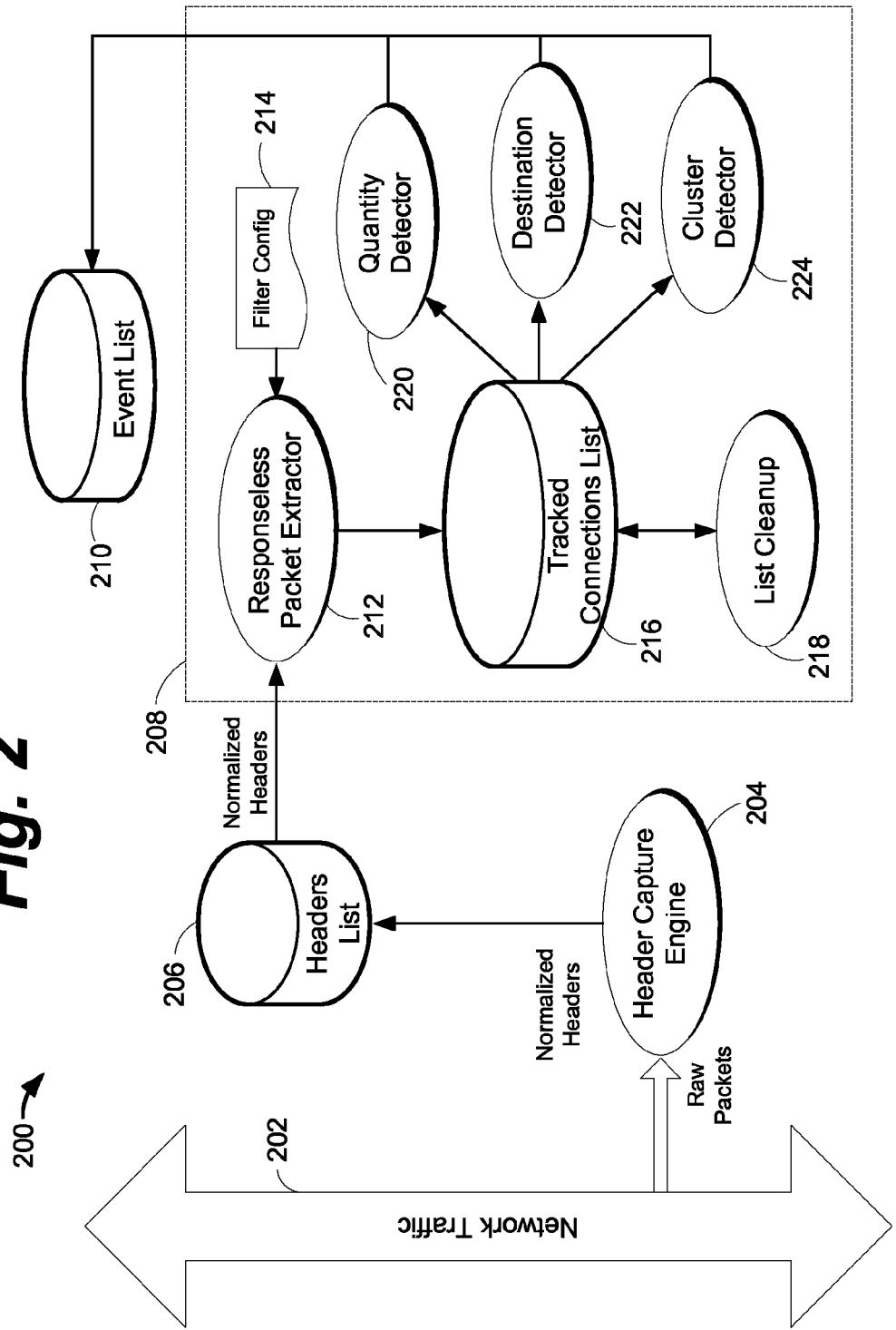
FIG. 2 depicts an illustration of a block diagram showing example components, connections and interactions of a network setup and a responseless packet alert module, according to one or more embodiments of the present disclosure.

FIG. 2 depicts an illustration of a block diagram showing example components, connections and interactions of a network setup 200 where one or more embodiments of the present disclosure may be useful in such a network setup. FIG. 2 shows a representation of network traffic 202, a packet header capture engine 204, a packet headers list 206, a responseless packet alert module 208 and an event list 210. Network traffic 202 may include a flow of raw packets, for example raw packets that are flowing over a network, such as the network 102 of FIG. 1. The packet header capture engine 204 may monitor and/or analyze raw packets from the network traffic 202 and may extract and/or capture the headers of the packets. Packet headers may include information about the packet including routing information such as source information (e.g., source IP address (Src), source port number (SrcPort)) and destination information (e.g., destination IP address (Dst), destination port number (DstPort)). It should be understood that in some embodiments of the present disclosure, "destination" may refer to more than just a single destination (e.g., a single computer, IP address, etc.). For example, a destination may refer generally to one or more groups of specific destinations, for example, ranges of network or IP addresses or the like. As such, even though various embodiments described herein may discuss a destination, it should be understood that various embodiments or alternate embodiments are contemplated that may apply the techniques described herein to one or more groups of destinations.

In some embodiments, the packet capture engine 204 may "normalize" the headers, meaning that it my group all identical headers that it sees in the network traffic 202 over a period of time, for example, over one minute. The packet header capture engine 204 may store the time of the first packet within that time period (start time) and the time of the last packet within that time period (end time). The packet header capture engine 204 may store packet headers, for example, in the packet headers list 206. The packet headers list may be a database or some other data store that may include rows of information. If the header capture engine 204 normalizes the headers, it may store each group of identical headers over a period of time in a single row of the headers list 206, including a count of the number of times the same header was seen over that period of time. The header capture engine 204 may also store the start time and end time of each group of headers. In this respect, packet header information may be compressed into fewer rows of the header list while still preserving information.

The packet headers list 206 may be provided as input to the responseless packet alert module 208. It should be understood that the example shown in FIG. 2 is just one example of how network traffic may be captured, accumulated and/or stored for analysis. In other embodiments of the present disclosure, the responseless packet alert module 208 may accept as input other forms of packet information. For example, responseless packet alert module 208 may be adapted to analyze full raw packet captures, traffic and/or packet stream information, and/or other formats of packet information. As another example, responseless packet alert module 208 may analyze each packet header instead of analyzing normalized headers. In these examples, the headers list 206 may store exact or approximate arrival times for each header instead of start and end times. In order to provide a clear description of the systems, methods, routines and/or techniques described herein, this disclosure will focus on normalized headers, for example, from a headers list 206, as the source of packet information for the responseless packet alert module 208. However, it should be understood that the descriptions of the various systems, methods, routines and/or techniques described herein may also apply to other sources of packet information.

The responseless packet alert module 208 may include a number of components, routines, algorithms, code, configuration data and the like. The responseless packet alert module 208 may include a responseless packet extractor 212, a filter configuration (config) file 214, a tracked connections list 216, a list cleanup module 218, a quantity detector module 220, a destination detector module 222 and a cluster detector module 224. The responseless packet extractor 212 may programmed and/or adapted to read and analyze header entries from the headers list 206. The network traffic may utilize one or more of a variety of communications protocols, and the responseless packet extractor 212 may read and analyze packet header entries associated with the protocol being used. In some embodiments, the network traffic may utilize a TCP protocol, in which case the responseless packet extractor 212 may read and analyze TCP packet header entries. The responseless packet extractor 212 may detect, extract, and/or initiate or cause storage of responseless packets, for example, DeadSYN packets. The responseless packet alert module 208 may use or accept as input filter configuration data 214, for example, one or more filter configuration (config) files. The responseless packet alert module 208 may communicate data and/or commands to the tracked connection list 216, and the tracked communication list may add and/or remove data to/from its data store as a result of communications from the responseless packet extractor 212.

The tracked connections list 216 may be a database or other data store, for example, a data store that is easily searchable. Each entry or row in the tracked connection list may include a unique "tuple." A tuple may refer to information about a packet that includes multiple pieces of data. As one example, a tuple may include the start time and end time (as determined by the header capture engine 204) and information from the packet header, such as source information (e.g., source IP address (Src), source port (SrcPort)), destination information (e.g., destination IP address (Dst), destination port (DstPort)), one or more flags if the protocol uses flags (e.g., a TCP-Flag) and the quantity of identical headers seen by the header capture engine 204 over the time period starting at the start time and ending at the end time. It should be understood that in some embodiments of the present disclosure, "destination" may refer to more than just a single destination (e.g., a single computer, IP address, etc.). For example, a destination may refer generally to one or more groups of specific destinations, for example, ranges of network or IP addresses or the like. As such, even though various embodiments described herein may discuss a destination, it should be understood that various embodiments or alternate embodiments are contemplated that may apply the techniques described herein to one or more groups of destinations. The tracked connection list may be in communication with a list cleanup module 218. The list cleanup module may communicate with the tracked connections list to maintain the entries in the tracked connection list, for example, removing entries that have existed in the list for a period of time.

A number of independent detector processes may be in communication with the tracked connection list 216, and may utilize the information stored in the tracked connection list 216. Examples of detector processes are the quantity detector 220, the destination detector 222 and the cluster detector 224. These three example processes are described in detail herein, but this disclosure contemplates other detector processes that function in a similar manner. Each detector process accepts as input entries from the tracked communications list 216. Each entry may be a tuples as explained above. Each detector process may output one or more events, for example, events that may be communicated to another entity for analysis. These events may indicate that anomalies have been detected in the network traffic that may be of interest. For example an operator may manually inspect a log of events and may take action, for example, to remove the offending software or prevent the device from performing malicious actions. As another example, events may be analyzed by a software package, an event correlation tool, event logging mechanism or other external entity, and these entities may detect interesting situations and/or assign threat levels to events.

Figure 3:
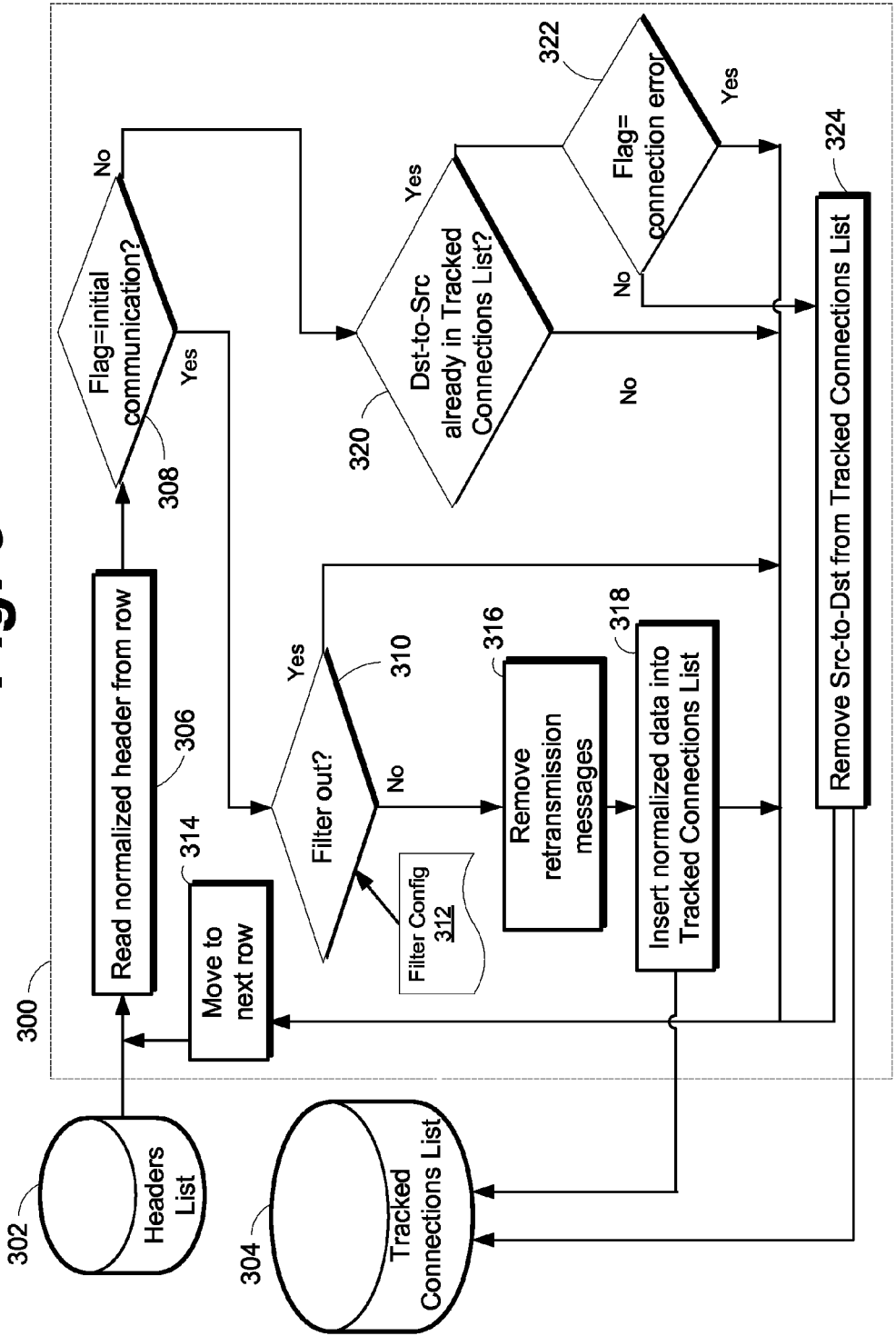
FIG. 3 depicts an illustration of a block diagram showing example components, routines, algorithms, configuration data and the like that may be found in a responseless packet extractor, according to one or more embodiments of the present disclosure.

FIG. 3 depicts an illustration of a block diagram showing example components, routines, algorithms, configuration data and the like that may be found in a responseless packet extractor 300, according to one or more embodiments of the present disclosure. Responseless packet extractor 300 may be similar to the responseless packet extractor 212 of FIG. 2. Responseless packet extractor 300 may communicate with a packet headers list 302 and a tracked connection list 304 that may be similar, respectively, to the packet headers list 206 and a tracked connection list 216 of FIG. 2.

The responseless packet extractor 300 may be programmed and/or adapted to read and analyze normalized header entries from the headers list 302. In some embodiments, the responseless packet extractor 300 may read and analyze normalized packet header entries (e.g., TCP packet header entries). The responseless packet extractor 300 may utilize a number of components, routines, algorithms, configuration data and the like to detect, extract and/or initiate or cause storage of responseless packets, for example, Dead-SYN packets. At step 306, a normalized header or record may be read or retrieved from the current entry or row in the headers list 302. The record may include a unique set of information identifying a packet. In some examples, the information includes the following: source information (e.g., Src, SrcPort), destination information (e.g., Dst, DstPort), one or more flags if the protocol has flags (e.g., a TCP Flag), start time, end time and the quantity of such identical packet headers being represented within that time period (i.e., between the start time and the end time). In other examples, for example, where headers are captured individually instead of being aggregated over a time period, the normalized header information may include a single time instead of a start time and end time. These pieces of information uniquely identifying a packet may be referred to as "normalized" fields. Normalized fields may be saved for each packet in the headers list 302 and for each connection in the tracked connection list 304. The term connection, for example, as used in the tracked connection list, may refer to information that is similar to a normalized packet. The term connection suggests, however, that the normalized packet is a piece of a full network transaction or handshake, for example, a TCP handshake.

As one example of a network transaction or handshake, intended to help fully describe the techniques herein and in no way intended as a limitation of the type of communications protocols contemplated by this disclosure, a TCP handshake is discussed. In general, the TCP protocol requires a 3-way handshake to set up a connection over a network, for example, the internet. TCP's three way handshaking technique may be referred to as SYN, SYN-ACK, ACK because there are three messages transmitted by TCP to negotiate and start a TCP session between two computers. The TCP handshaking mechanism is designed so that two computers attempting to communicate can negotiate the parameters of the network TCP socket connection before transmitting data, for example, SSH and HTTP web browser requests. The first message transmitted according to the TCP protocol is the SYN message or packet, which is transmitted from the source (src) to the destination (dst). The second message transmitted according to the TCP protocol is the SYN-ACK message or packet, which is transmitted from the destination (dst) to the source (src). The third message transmitted according to the TCP protocol is the ACK message or packet, which is transmitted from the source (src) to the destination (dst). The responseless packet extractor 300 may programmed and/or adapted to recognize that nearly every TCP transaction starts with a SYN message or packet, and for a proper connection to be formed, the src must receive some response from the dst. It may be possible, according to the TCP protocol, that a response packet may be some message type other than SYN-ACK. Therefore, the responseless packet extractor 300 may programmed and/or adapted to be flexible as to the type of response data.

At step 308, the responseless packet extractor 300 may analyze the normalized header that was read at step 306, for example, by analyzing a flag or flag field (e.g., TCP Flag) of the header, to determine whether the packet (e.g., a TCP packet) is an initial communication (e.g., a SYN message or packet). If the packet is an initial communication (e.g., a SYN message), the responseless packet extractor 300 may interpret this packet as the start or initiation of a transaction or communication. Packet extractor 300 may cause storage and/or tracking of packet information of this packet if this packet is associated with the initiation of a transaction or network communication and if the packet information is determined to be a potential responseless packet as described further. If the packet is an initial communication (e.g., a SYN message), at step 310, the responseless packet extractor 300 may determine whether the packet should be filtered out, meaning that the packet will not be tracked. Packets may be filtered out for a variety of reasons and by a variety of manners. For example, packets that are attempting to initiate a connection with a trusted destination may be filtered out. At step 310, the responseless packet extractor 300 may use filter configuration data 312, for example, from a configuration file or configuration database. The filter configuration data may be user-created and/or user-provided, and it may contain a list of fields and the like that indicate that particular packets should be filtered out. For example, the filter configuration data may contain a list of sources, destinations and/or source/destination combinations that should be filtered out. As another example, the filter configuration data may contain times, time periods or other time-based metrics that indicate packets that should be filtered out. This time-based filtering may be useful, for example, if users or administrators knew that a network or machine was going to be down for a period of time, for example, for maintenance or a planned outage. At step 310, responseless packet extractor 300 may compare the normalized header read at step 306 to the filter configuration data 312, and if the file indicates that the packet should be filtered out, the responseless packet extractor 300 does not track the connection and moves to the next row or normalized header (step 314) in the headers list 302.

If the header/packet (e.g., the TCP SYN header/packet) is not filtered out at step 310, at step 316, the initial communication packet (e.g., the TCP SYN message) is removed (i.e., not tracked) if the responseless packet extractor 300 determines that the initial communication packet was caused by a retransmission protocol (e.g., the TCP retransmission protocol). As one example, according to the TCP protocol, the TCP SYN message may be attempted four times before the packet is determined to be unresponsive or dead. Subsequent SYN message attempts after the initial SYN message are referred to as retransmissions. Therefore, at step 316, if the initial communication packet (e.g., the SYN message) is a subsequent initial communication packet, for example, within a period of time, with the same header information (e.g., src, dst, src-port, dst-port, etc.), it may be determined to be a retransmission. In some embodiments, the responseless packet extractor 300 may communicate with the tracked connections list 304 to determine whether a similar initial communication packet has been detected recently. In some embodiments, the responseless packet extractor 300 may determine that the packet is a retransmission from information in the packet itself, for example, the header of the packet. Removing (i.e., not tracking) retransmission messages may prevent duplicate tracking of the same TCP connections.

At step 318, if the initial communication packet or message (e.g., the TCP SYN packet or message) was not filtered out or removed, the normalized header may be communicated to the tracked connections list 304, such that the tracked connections list 304 may save, store and/or track the normalized header information as a potentially responseless packet, for example, utilizing one entry or row per normalized header. For example, if the normalized header contains a field that indicates the number of similar headers (i.e., a count) that were seen between the start time and end time, the responseless packet extractor 300 may save or store the normalized header information if the count is 1 or more. In this respect, potentially responseless packets, for example, Dead-SYN packets, may be added to the tracked connection list. If a connection added to the tracked connections list is not removed later, for example, by some other routine, step or the like that determines that a response or reply was seen for the connection, the connection may be flagged as a responseless packet that may be indicative of malware. Routine, steps, components, rules and/or the like that may remove connections from the tracked connections list will be described below. After step 318, the responseless packet extractor 300 moves to the next row or normalized header (step 314) in the headers list 302.

At step 308, the responseless packet extractor 300 may analyze the normalized header that was read at step 306, for example, by analyzing a flag or flag field (e.g., the TCP Flag field) of the header, to determine whether the packet (e.g., the TCP packet) is an initial communication packet (e.g., a SYN message or packet). If the packet is not an initial communication packet (e.g., a SYN message), the responseless packet extractor 300 may further analyze the packet. At step 320 and step 322, the responseless packet extractor 300 may determine whether the packet header that was read at step 306 is a response or reply packet to a communication that is being tracked in the tracked connections list 304. If the packet is a response or reply, the previously analyzed initial communications packet (e.g., a TCP SYN packet) is not a responseless packet and may not be flagged as malware. At step 320, the responseless packet extractor 300 may communicate with the tracked connections list 304 to determine whether an entry or connection already exists in the database that includes header information that is essentially reversed (Dst-to-Src) compared to the instant header (Src-to-Dst). If a TCP SYN packet with particular Src and Dst is transmitted according to a communications protocol (e.g., the TCP protocol), it may be expected that the response packet to the initial communication packet (e.g., the SYN packet) has a Src that is the same as the Dst of the initial communication packet and a Dst that is the same as the Src of the initial communication packet. If the header information of the immediate packet and a stored packet match in this reversed manner, the immediate packet may be a response packet for a connection that was previously stored in the tracked connections list 304. If the header information of the immediate packet and a stored packet do not match, the packet is ignored (i.e., not tracked) and the responseless packet extractor 300 moves to the next row or normalized header (step 314) in the headers list 302.

At step 322, the responseless packet extractor 300 may determine whether the response packet contains a flag (e.g., a TCP Flag) or other data that indicates that the response packet does not contain a substantive response. As an example, the flag may indicate a connection error (e.g., the RST (reset) flag in the TCP protocol). According to the TCP protocol, a reset packet is used to indicate that a connection was refused. If the packet does contain a substantive response (e.g., not a connection error), the responseless packet extractor 300 may remove the packet or header (Src-to-Dst) from being tracked (step 324), for example, by communicating with the tracked connections list 304. The responseless packet extractor 300 may remove the packet from being tracked because a response packet was received from the destination and the response packet was substantive (i.e., not a reset packet or a packet indicating a refused connection). The responseless packet extractor 300 may remove the packet from being tracked because it has determined that the packet is not a responseless packet (e.g., a Dead-SYN). Therefore, the packet will not be flagged as potential malware. After removing the packet from the tracked connection list 304, the responseless packet extractor 300 may move to the next row or normalized header (step 314) in the headers list 302. At step 322, if the responseless packet extractor 300 determines that the packet is not a substantive packet, for example, a reset packet or a packet indicating a connection error, then the packet is ignored (i.e., the corresponding packet is not removed from the tracked connections list), and the responseless packet extractor 300 may move to the next row or normalized header (step 314) in the headers list 302. In this respect, the responseless packet extractor 300 may treat a connection-error or reset packet as though no response came back at all.

Figure 4:
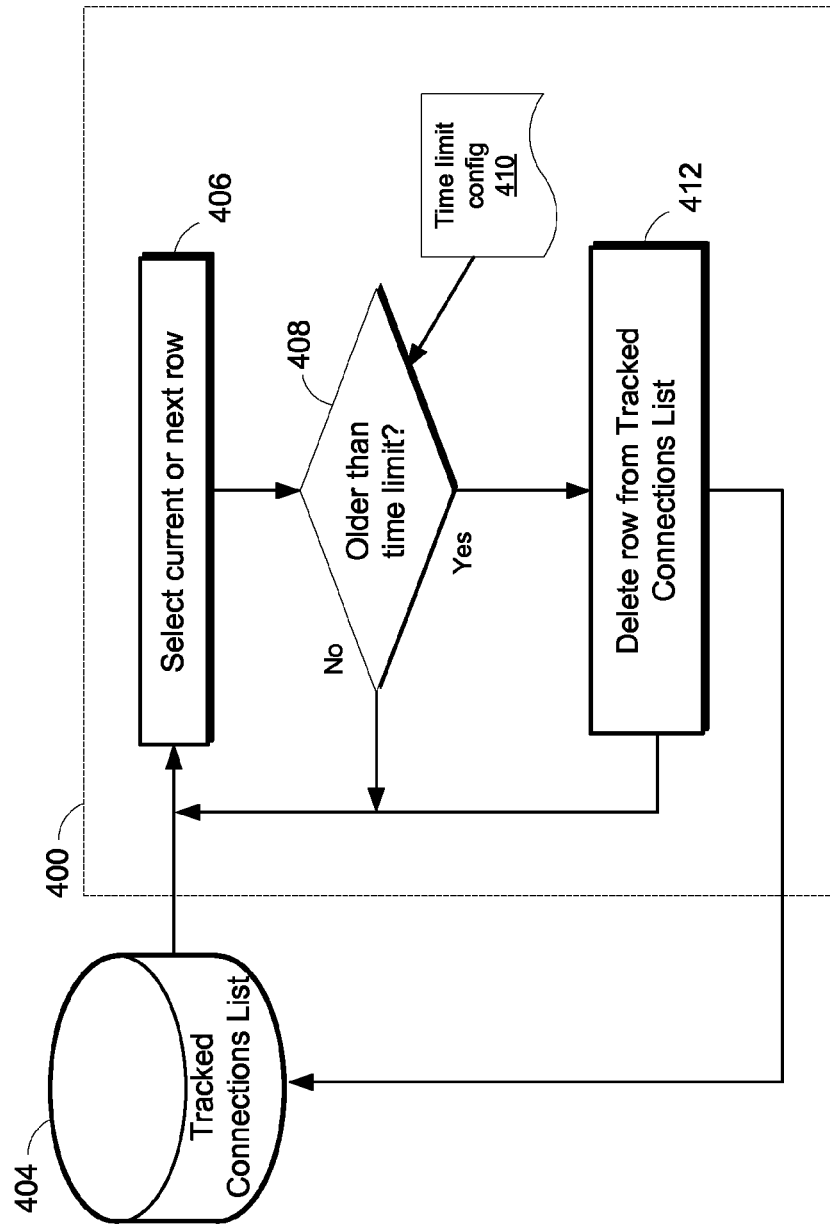
FIG. 4 depicts an illustration of a block diagram showing example components, routines, algorithms, configuration data and the like that may be found in a list cleanup module, according to one or more embodiments of the present disclosure.

FIG. 4 depicts an illustration of a block diagram showing example components, routines, algorithms, configuration data and the like that may be found in a list cleanup module 400, according to one or more embodiments of the present disclosure. List cleanup module 400 may be similar to the list cleanup module 218 of FIG. 2. List cleanup module 400 may communicate with a tracked connection list 404 that may be similar to the tracked connection list 216 of FIG. 2.

The list cleanup module 400 may be in communication with a tracked connection list 404 to maintain the entries in the tracked connection list 404, for example, communicating with the tracked connections list 404 such that the tracked communications list 404 removes entries that have existed in the list for a period of time and no longer require tracking. The list cleanup module 400 may utilize a number of components, routines, algorithms, configuration data and the like to maintain the entries in the tracked connection list 404. At step 406, the list cleanup module 400 may select and read an entry or row (for example, the current entry or row) in the tracked communications list 404. At step 408, the list cleanup module 400 may determine whether the connection has been in the list for long enough such that it no longer should be tracked. The list cleanup module 400 may compare a time field in the packet header (for example, an end time) to one or more time limits, for example, a maximum storage time limit. For example, if the normalized header contains a start time and an end time, list cleanup module 400 may compare the time limit to the end time because the end time may represent the latest time that the tracked connection was seen. The time limits may be user provided and/or user specified, for example, in time limit configuration data 410, for example, from a configuration file or configuration database. The time limit(s) may be set to a variety of values, for example, days, weeks, months and/or the like. Referring to step 408, if the tracked connection has not exceeded the time limit(s), list cleanup module 400 may initiate no action with respect to the tracked connections list 404, and may return to step 406, selecting and/or reading the next entry or row in the tracked connections list 404.

The list cleanup module 400 may remove entries from the tracked connections list for a variety of reasons. For example, a time limit may represent the determination that after a period of time, a flagged connection will have been handled or dealt with by that time if it is going to be handled at all. As another example, the system(s) that are used to implement the one or more embodiments of the present disclosure may have limited resources, for example, data storage. Time limits for removing connections may be a sensible manner of preventing the tracked connections list from consuming too many resources and/or too much storage space.

At step 412, if the tracked connection is older than the time limit(s), then the list cleanup module 400 may communicate with the tracked connections list 404 such that the tracked communications list 400 may remove the connection. Then, list cleanup module 400 may initiate may return to step 406, selecting and/or reading the next entry or row in the tracked connections list 404.

Figure 5:
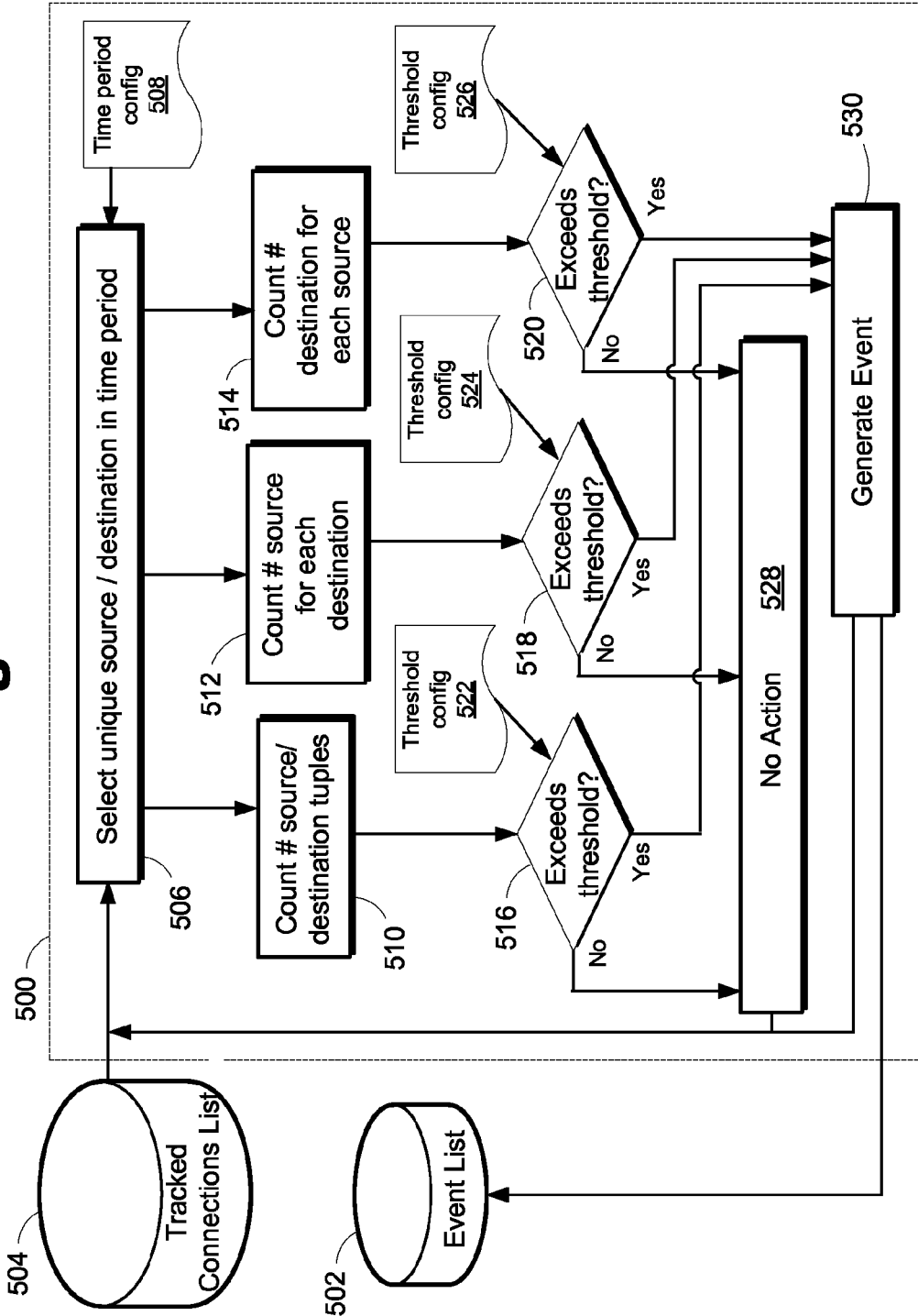
FIG. 5 depicts an illustration of a block diagram showing example components, routines, algorithms, configuration data and the like that may be found in a quantity detector module, according to one or more embodiments of the present disclosure.

FIG. 5 depicts an illustration of a block diagram showing example components, routines, algorithms, configuration data and the like that may be found in a quantity detector 500, according to one or more embodiments of the present disclosure. Quantity detector 500 may be similar to the quantity detector 220 of FIG. 2. Quantity detector 500 may communicate with a tracked connection list 504 that may be similar to the tracked connection list 216 of FIG. 2. Quantity detector 500 may utilize the information stored in the tracked connection list 504.

Quantity detector 500 may accept as input entries from the tracked communications list 504. Each entry may include a tuple. As one example, a tuple may include the start time and end time and unique packet header information, such as source information (e.g., source IP address (Src), source port (SrcPort)) and destination information (e.g., destination IP address (Dst), destination port (DstPort)) as seen by a header capture engine over the time period starting at the start time and ending at the end time. It should be understood that in some embodiments of the present disclosure, "destination" may refer to more than just a single destination (e.g., a single computer, IP address, etc.). For example, a destination may refer generally to one or more groups of specific destinations, for example, ranges of network or IP addresses or the like. As such, even though various embodiments described herein may discuss a destination, it should be understood that various embodiments or alternate embodiments are contemplated that may apply the techniques described herein to one or more groups of destinations. Quantity detector 500 may output one or more events (see step 530 and event list 502), for example, events that may be communicated to another entity for analysis and/or action. These events may indicate that anomalies have been detected in the network traffic that may be of interest. Malware hackers may constantly change their destination servers to avoid detection; therefore, quantity detector 500 may utilize a number of different checks and/or comparisons with respect to the data in the tracked connections list, for example, to detect different types of behavior that may be indicative of malware.

The quantity detector 500 may utilize a number of components, routines, algorithms, configuration data and the like to analyze various responseless tracked connections to determine if the connections are potentially indicative of malware and/or infected devices. At step 506, the quantity detector 500 may select and/or read a number of entries or rows from the tracked connections list 504. For example, the quantity detector 500 may read all entries with a unique source and destination (e.g., a unique Src, Dst, SrcPort and DstPort) within a period of time. This time period may be a different time period than the one used by the header capture engine 204 of FIG. 2. The time period used by the quantity detector 500 may span several entries or rows in the tracked connections list 504.

The time period used by the quantity detector 500 may be user defined and/or user provided, for example, by time period configuration data 508, for example, from a configuration file or configuration database. The time period used by the quantity detector 500 may be adjusted to provide minimum false-positive event generations. The time period used by the quantity detector 500 may be used because a reply or response packet for a tracked connection will take time to be received. The time period used by the quantity detector 500 may be used so that the responseless packet extractor 300 is allowed time to remove any "non-dead" packets (packets that received a substantive response) from the tracked connections list. The time period used by the quantity detector 500 may be used to handle a retransmission protocol as discussed above, which can take several minutes (e.g., 3 minutes for the TCP protocol). The quantity detector 500 may utilize a time period that allows a buffer for a retransmission protocol to finish, for example, 5 minutes for the TCP protocol. The quantity detector 500 may utilize a time period that is long enough to allow a reasonable number of responseless packets to build up in the tracked connections list 504, for example, such that trends and/or reoccurrences can be detected. A time period that is too short may lead to spotty or intermittent detection of anomalies.

In some embodiments of the present disclosure, the quantity detector 500 may utilize two or more time periods. One time period may be relative short, for example, to detect issues quickly, and the other time period may be longer, for example, to more accurately detect (i.e., with a higher degree of confidence and/or accuracy) anomalies and/or potentially infected devices. As one example, the shorter time period may be 60 minutes, and the longer time period may be two days. Various other time periods may be used to optimize the results and/or to target situations that are interesting to a user and/or administrator. Two or more time periods may be useful for a variety of reasons. For example, various types of malware may exhibit different beaconing behaviors (e.g., shorter or longer beaconing cycles). The quantity detector 500 may use various time periods to attempt to capture packets that are sent according to various beaconing behaviors.

At step 510, once the set of packets or headers with unique source and destination (e.g., unique Src, Dst, SrcPort, DstPort fields) is selected within a time frame (or multiple time frames), the quantity detector 500 may count the number of unique source/destination tuples (e.g., Src, Dst, DstPort tuples). This count may be used to detect the situation where a single given source device has generated multiple responseless packets (i.e., non-replied to SYN attempts) to the same destination device and/or service. At step 516, the count is compared to a threshold to determine whether the count exceeds the threshold. The threshold may be user configured and/or user provided, for example, by threshold configuration data 522, for example, from a configuration file or configuration database. At step 516, if the count is less than the threshold, then no action is taken (step 528), and the quantity detector 500 returns to step 506 to select the next set of unique tuples. If the count is more than the threshold, the quantity detector 500 may generate an event (step 530) and may communicate the event to the event list 502. The quantity detector 500 may then return to step 506 to select the next set of unique tuples.

With regard to the quantity detector 500 and the various threshold configuration data (e.g., configuration data 522, 524, 526) and the various threshold comparisons (e.g., steps 516, 518, 520), it should be understood that in the case where multiple time periods are used, as explained above, additional thresholds may be used and/or additional threshold comparison steps may be added. For example, at the various threshold comparison steps (e.g., steps 516, 518, 520), the threshold comparison steps may execute a different comparison for each time period, and may reference a different threshold value for each time period. In this respect, the quantity detector 500 may generate one or more events that correspond to these various thresholds, threshold comparisons and time periods.

At step 512, once the set of packets or headers with unique source/destination (e.g., unique Src, Dst, SrcPort, DstPort fields) is selected within a time frame (or multiple time frames), the quantity detector 500 may counts the number of different source devices for each unique destination device or service (e.g., a unique Dst/DstPort tuple). This count may be used to detect the situation where multiple source devices have been infected with the same malware and are all attempting to communicate with the same C&C server. At step 518, the count is compared to a threshold to determine whether the count exceeds the threshold. The threshold may be user configured and/or user provided, for example, by threshold configuration data 524, for example, from a configuration file or configuration database. At step 518, if the count is less than the threshold, then no action is taken (step 528), and the quantity detector 500 returns to step 506 to select the next set of unique tuples. If the count is more than the threshold, the quantity detector 500 may generate an event (step 530) and may communicate the event to the event list 502. The quantity detector 500 may then return to step 506 to select the next set of unique tuples.

At step 514, once the set of packets or headers with unique source/destination (e.g., unique Src, Dst, SrcPort, DstPort fields) is selected within a time frame (or multiple time frames), the quantity detector 500 may counts the number of different destinations devices or services (e.g., unique Dst/DstPort tuples) that each source device has attempted to communicate with and failed. This count may be used to detect the situation where a single source device is attempting to communicate with multiple destination devices and failing constantly. This situation may indicate common behavior of APT malware. At step 520, the count is compared to a threshold to determine whether the count exceeds the threshold. The threshold may be user configured and/or user provided, for example, by threshold configuration data 526, for example, from a configuration file or configuration database. At step 520, if the count is less than the threshold, then no action is taken (step 528), and the quantity detector 500 returns to step 506 to select the next set of unique tuples. If the count is more than the threshold, the quantity detector 500 may generate an event (step 530) and may communicate the event to the event list 502. The quantity detector 500 may then return to step 506 to select the next set of unique tuples.

FIG. 6 depicts an illustration of a block diagram showing example components, routines, algorithms, configuration data and the like that may be found in a destination detector module 600, according to one or more embodiments of the present disclosure. Destination detector 600 may be similar to the destination detector 222 of FIG. 2. Destination detector 600 may communicate with a tracked connection list 604 that may be similar to the tracked connection list 216 of FIG. 2. Destination detector 600 may utilize the information stored in the tracked connection list 604.

Destination detector 600 may accept as input entries from the tracked communications list 604. Each entry may include a tuple. As one example, a tuple may include the start time and end time and unique packet header information, such as source information (e.g., source IP address (Src), source port (SrcPort)) and destination information (e.g., destination IP address (Dst), destination port (DstPort)) as seen by a header capture engine over the time period starting at the start time and ending at the end time. It should be understood that in some embodiments of the present disclosure, "destination" may refer to more than just a single destination (e.g., a single computer, IP address, etc.). For example, a destination may refer generally to one or more groups of specific destinations, for example, ranges of network or IP addresses or the like. As such, even though various embodiments described herein may discuss a destination, it should be understood that various embodiments or alternate embodiments are contemplated that may apply the techniques described herein to one or more groups of destinations. Destination detector 600 may output one or more events (see steps 620, 632 and event list 602), for example, events that may be communicated to another entity for analysis and/or action. These events may indicate that anomalies have been detected in the network traffic that may be of interest.

The destination detector 600 may utilize a number of components, routines, algorithms, configuration data and the like to analyze various responseless tracked connections to determine if the connections are potentially indicative of malware and/or infected devices. At step 606, the destination detector 600 may select and/or read a number of entries or rows from the tracked connections list 604. For example, the destination detector 600 may read all entries with a unique source/destination (e.g., Src, Dst, SrcPort and DstPort) within a period of time. This time period may be a different time period than the one used by the header capture engine 204 of FIG. 2. The time period used by the destination detector 600 may span several entries or rows in the tracked connections list 604.

The time period used by the destination detector 600 may be user defined and/or user provided, for example, by time period configuration data 608, for example, from a configuration file or configuration database. The time period used by the destination detector 600 may be adjusted such that the destination detector 600 may detect anomalies in packets over a longer period of time than, for example, the time period(s) used by the quantity detector 500 of FIG. 5. The time period used by the destination detector 600 may be adjusted to provide minimum false-positive event generations, for example, a time period that is long enough to allow for a more defined view of communication trends. As one example, a malware program, for example, an APT program, may attempt to communicate with the same destination server, sometimes making the same number of attempts, at regular intervals. Additionally, some hackers may maintain many destination servers, and some malware programs may wait long periods of time between connection attempts to a particular server. The time period used by the destination detector 600 may be adjusted such that the time period is long enough to notice trends to a particular destination over a longer period of time, for example, the average number of times a source attempts to contact a particular destination (e.g., 15 attempts over two weeks).

In some embodiments of the present disclosure, the destination detector 600 may utilize two or more time periods. The multiple time periods may be overlapping, for example, a one-week time period, a four-week time period, and an eight-week time period. The destination detector 600 may utilize multiple time periods to attempt to detect various types of malware and/or various types of beaconing behavior. In the embodiments that utilize multiple time periods, threshold configuration data 616 may include distinct sets of configuration data for each time period, for example, different configuration files or different data in a configuration database.

At step 610, once the set of packets or headers with unique source/destination (e.g., unique Src, Dst, SrcPort, DstPort fields) is selected within a time frame (or multiple time frames), the destination detector 600 may count the number of times each destination (e.g., Dst, DstPort tuple) occurs in the set. This count may be used to detect the situation where multiple sources attempt to establish a connection with a common destination, for example, a potential APT C&C server. At step 612, each unique destination (e.g., Dst/DstPort tuple) from the set is analyzed. As a sub-step to step 612, at step 614, for each unique destination (e.g., Dst/DstPort tuple) from the set the count of the number of times this destination occurs is compared to a threshold to determine whether the count exceeds the threshold. The threshold may be user configured and/or user provided, for example, by threshold configuration data 616, for example, from a configuration file or configuration database. At step 614, if the count is less than the threshold, then no action is taken (step 618), and the destination detector 600 may return to step 606 to select the next set of unique tuples. If the count is more than the threshold, the destination detector 600 may generate an event (step 620) and may communicate the event to the event list 602. The event may indicate that the particular destination (e.g., Dst/DstPort combination) is related to a potential malware (e.g, APT) C&C server or device. The destination detector 600 may then return to step 606 to select the next set of unique tuples.

At step 622, one or more routines may begin that determine whether the particular destination (e.g., Dst/DstPort tuple) identified at step 614 is a recurring malware (e.g., APT) C&C server or device. At step 622, the destination detector 600 may calculate the average number of times that the particular destination (e.g., Dst/DstPort tuple) has been the target of a responseless packet (e.g., a Dead-SYN packet) per source device. This calculation may provide an estimate of how frequently a source attempts to connect with the destination occur over the time period. At step 624, the result of the calculation of step 622 may be compared to the result of the same calculation (i.e., average destination per source) that was performed for one or more previous time periods. At step 626, if the averages from the current time period and the past time period(s) are close, for example, within 1 standard deviation of each other, that may indicate that sources are attempting, on a regular and recurring basis, to connect to the same destination, for example, a potential C&C server (e.g., 15 attempts over the immediate two weeks, the previous two weeks, etc.). This may be indicative of reoccurring code in malware that attempts to beacon at regular intervals. At step 630, the destination detector 600 may communicate with the tracked connections list 604 to retrieve and/or generate a list of all source devices that have responseless packets (e.g., Dead-SYN packets) with the current destination (e.g., Dst/DstPort tuple). The destination detector 600 may then generate an event for each source and may communicate these events to the event list 602. The event for each source may indicate, for example, with a high probability, that the source is likely infected with malware, for example, APT malware, that is attempting to communicate with a C&C server related to the destination.

At step 626, if the averages from the current time period and the past time period(s) are not close, for example, not within 1 standard deviation of each other, then the destination detector 600 may not generate any events and may return to step 606 to select the next set of unique tuples.

Figure 7A:
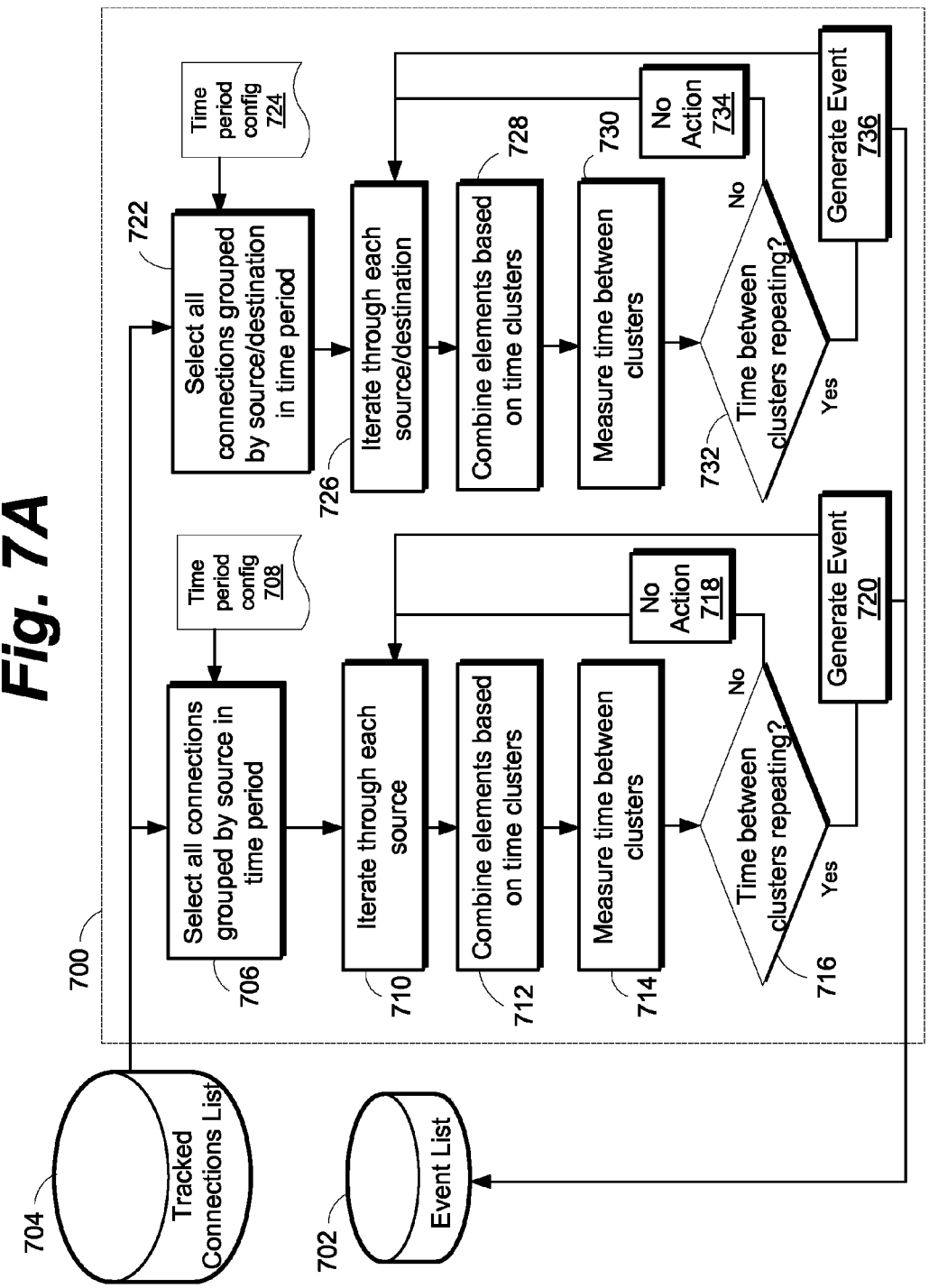
FIG. 7A depicts an illustration of a block diagram showing example components, routines, algorithms, configuration data and the like that may be found in a cluster detector module, according to one or more embodiments of the present disclosure.

FIG. 7A depicts an illustration of a block diagram showing example components, routines, algorithms, configuration data and the like that may be found in a cluster detector module 700, according to one or more embodiments of the present disclosure. Cluster detector 700 may be similar to the cluster detector 224 of FIG. 2. Cluster detector 700 may communicate with a tracked connection list 704 that may be similar to the tracked connection list 216 of FIG. 2. Cluster detector 700 may utilize the information stored in the tracked connection list 704.

Cluster detector 700 may accept as input entries from the tracked communications list 704. Each entry may include a tuple. As one example, a tuple may include the start time and end time and unique packet header information, such as source information (e.g., source IP address (Src), source port (SrcPort)) and destination information (e.g., destination IP address (Dst), destination port (DstPort)) as seen by a header capture engine over the time period starting at the start time and ending at the end time. It should be understood that in some embodiments of the present disclosure, "destination" may refer to more than just a single destination (e.g., a single computer, IP address, etc.). For example, a destination may refer generally to one or more groups of specific destinations, for example, ranges of network or IP addresses or the like. As such, even though various embodiments described herein may discuss a destination, it should be understood that various embodiments or alternate embodiments are contemplated that may apply the techniques described herein to one or more groups of destinations. Cluster detector 700 may output one or more events (see steps 720, 736 and event list 702), for example, events that may be communicated to another entity for analysis and/or action. These events may indicate that anomalies have been detected in the network traffic that may be of interest.

The cluster detector 700 may utilize a number of components, routines, algorithms, configuration data and the like to analyze various responseless tracked connections to determine if the connections are potentially indicative of malware and/or infected devices. For example, the cluster detector 700 may detect periodicity between clusters of responseless connection attempts made by sources. At step 706, the cluster detector 700 may select and/or read a number of entries or rows from the tracked connections list 704. For example, the cluster detector 700 may read all entries within a time period and may group the entries by source. This time period may be a different time period than the one used by the header capture engine 204 of FIG. 2. This time period used by the cluster detector 700 (at step 706) may span several entries or rows in the tracked connections list 704.

The time period used by the cluster detector 700 (at step 706) may be user defined and/or user provided, for example, by time period configuration data 708, for example, from a configuration file or configuration database. The time period used by the cluster detector 700 (at step 706) may be adjusted such that the cluster detector 700 may detect anomalies in packets over a longer period of time than, for example, the time period(s) used by the quantity detector 500 of FIG. 5. The time period used by the cluster detector 700 (at step 706) may be shorter than, for example, the time period(s) used by the destination detector 600 of FIG. 6. The time period used by the cluster detector 700 may be adjusted such that reoccurring behavior with respect to a particular source may be detected. For example, malware running on an infected device may attempt to make several connections (e.g., with several different destination servers) within a short period of time (i.e., the connections may be clustered together in time), and then the malware may wait for a relatively long period of time before attempting another cluster of connections. In other words, malware (e.g., APT malware) may send out beacons (or clusters of beacons) to C&C servers at a regular and recurring interval.

In some embodiments of the present disclosure, the cluster detector 700 may utilize two or more time periods, for example, to minimize false-positive event generations. The multiple time periods may be overlapping, for example, a two-week time period, a four-week time period, and a six-week time period. The cluster detector 700 may utilize multiple time periods to attempt to detect various types of malware and/or various types of beaconing behavior. In the embodiments that utilize multiple time periods, threshold configuration data 708 and/or 724 may include distinct sets of configuration data for each time period, for example, different configuration files or different data in a configuration database.

At step 710, for each unique source, all the entries or packets from the set (step 706) with that common source are analyzed. As a sub-step to step 710, at step 712, for each source, all of the packets may be grouped into time clusters. FIG. 7B shows an illustration of a graph 750 that shows example connections attempted by a source over time. As can be seen in FIG. 7B, a first clustering 752 occurred a little after the 10:00:00 mark, and a second clustering 754 occurred around the 10:57:36 mark. Referring again to FIG. 7A, the cluster detector 700 may be programmed and/or designed to recognize the various connection attempts that are relatively close together as a single cluster instead of several discreet data points. The cluster detector 700 may be programmed and/or designed to combine various connection attempts that are relatively close together into a single data point (for example, two data points 752, 754 in FIG. 7B). The cluster detector 700 may then perform operations, routines and the like using the cluster data points, for example, because patterns may be more noticeable when comparing clusters of connection attempts as opposed to exact connection times.

At step 714, the cluster detector 700 may measure the time between the clusters of connection attempts. At step 716, the cluster detector 700 may determine whether the time between clusters appears to form in a repeating pattern or at regular intervals. For example, at step 716, the cluster detector 700 may detect whether the times between connection attempt clusters are close, for example, within 1 standard deviation of each other. At step 716, if the time between clusters does not appear to form a pattern, then the cluster detector 700 takes no action with respect to event generation (step 718), and returns to step 710 to repeat the iteration for each source. If the time between clusters appears to form a pattern, then the cluster detector 700 may generate an appropriate event (step 720), and may communicate the even to the event list 702. The event may indicate that the particular source may be infected with malware, for example, APT malware that may be beaconing to a C&C server on a recurring basis. The cluster detector 700 may then return to step 710 to repeat the iteration for each source.

At step 722, the cluster detector 700 may begin one or more routines that are similar to the routine(s) that started at step 706. For example, the routine(s) starting at step 722 may use similar clustering and detection steps. The routine(s) starting at step 722 may use different input data sets than the routine(s) that started at step 706, and therefore, the event(s) generated (at step 736) may be different. At step 722, the cluster detector 700 may select and/or read a number of entries or rows from the tracked connections list 704. For example, the cluster detector 700 may read all entries within a time period and may group the entries by source/destination tuple (e.g., Src/Dst/DstPort tuple). This time period used by the cluster detector 700 (at step 722) may span several entries or rows in the tracked connections list 704. This time period used by the cluster detector 700 (at step 722) may be user defined and/or user provided, for example, by time period configuration data 724, for example, from a configuration file or configuration database. This time period may be similar to the time period associated with time period configuration data 708; however, it may be different and/or independently configured. At step 726, for each unique source/destination (e.g., Src/Dst/DstPort tuple), all the entries or packets from the set (step 722) with that common source/destination are analyzed. Steps 728, 730, 732, 734, 736 are then executed in a manner similar to steps 712, 714, 716, 718, 720. The event(s) generated at step 736 may indicate that a particular source may be infected with an malware (e.g., APT malware) and may also indicate exactly which C&C server or device the source is beaconing to. Knowing the C&C server may help determine exactly which malware program or APT malware program is present on the Src device.

Regarding the benefits of detection of infected network devices via analysis of responseless outgoing network traffic, the following describes further benefits of one or more embodiments of the present disclosure. It is to be understood that the described benefits are not limitations or requirements, and some embodiments may omit one or more of the described benefits.

One or more embodiments of the present disclosure may be adapted to be operable within a larger suite or package of network security tools. The systems, methods, routines and/or techniques described in the present disclosure may form one or more tools within a network security package, for example, as one source for generating warning events and the like. A network security package may also include one or more event correlators or the like that may analyze warning events.

The systems, methods, routines and/or techniques described in the present disclosure may allow for detection of malware without requiring signatures and/or fingerprints for recognized threats or knowledge about notoriously malicious IP addresses. Because the systems, methods, routines and/or techniques described may detect malware without analyzing the code of the malware program, by analyzing packet behavior, it can detect a broad range of malicious code, for example, new malware programs where signature and/or fingerprint files are not yet known. Therefore, the systems, methods, routines and/or techniques described in the present disclosure may offer benefits of various techniques that rely on large rule or signature based comparison approaches.

The systems, methods, routines and/or techniques described in the present disclosure may automate analysis that a security professional would likely perform if the security professional were able to analyze the entire packet stream and recognize patterns in the overwhelming amount of data (e.g., in excess of 16 billion packets per day in some sample implementations). The systems, methods, routines and/or techniques described herein may aid a security professional to rapidly identify potentially infected devices, thus optimizing time. Additionally, because previous knowledge about threats (i.e., signatures, etc.) is not required, a security professional may not need to "prime" the system with specific types of knowledge, so the system may take less effort and time to set up. Additionally, security professionals may be able to detect threats which they previous may not have had the time or information to detect.

The systems, methods, routines and/or techniques described in the present disclosure may allow for significant cost savings, for example, because less manpower may be required to detect threats. The systems, methods, routines and/or techniques described in the present disclosure may help individuals and entities prevent the loss of sensitive information, for example, intellectual property and confidential information. Early detection of harmful malware may allow an individual or entity to take early remediation steps, which may save millions of dollars, in the case of a large entity.

The systems, methods, routines and/or techniques described in the present disclosure, including the example methods and routines illustrated in the flowcharts and/or block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. The different embodiments of the present disclosure can take the form of computer code stored on persistent storage and/or a computer usable or computer readable medium, accessible from a computer program product, providing program code for use by or in connection with a computer or any device or system that executes instructions. Part or all of the computer code may be loaded into the memory of a data processing system before the data processing system executes the code.

Figure 8:
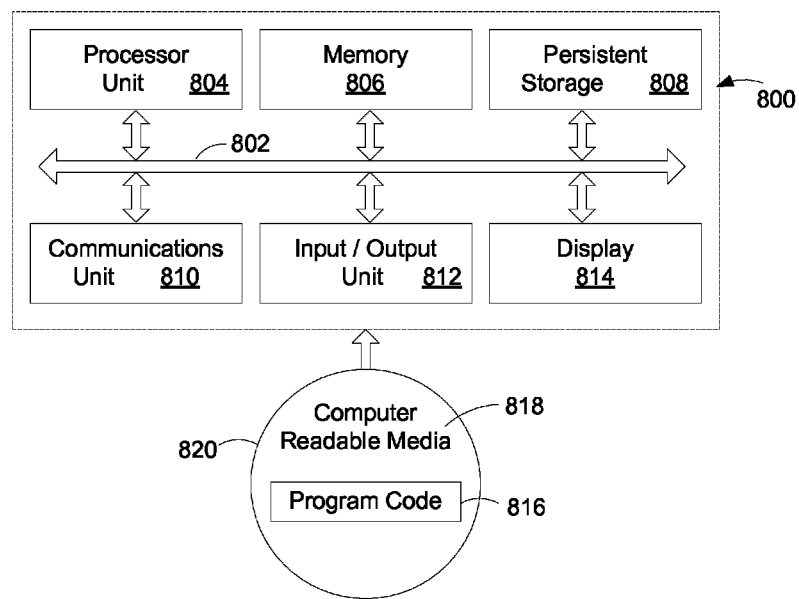
FIG. 8 depicts a diagram of an example data processing system that may execute, either partially or wholly, one or more of the methods, routines and solutions of the present disclosure, in accordance with one or more embodiments of the present disclosure.

Turning now to FIG. 8, a diagram of an example data processing system 800 is depicted that may execute, either partially or wholly, one or more of the methods, routines and/or techniques of the present disclosure. In some embodiments of the present disclosure, more than one data processing system, for example data processing systems 800, may be used to implement the methods, routines, techniques and solutions described herein. In the example of FIG. 8, data processing system 800 may include a communications fabric 802 which provides communications between components, for example, a processor unit 804, a memory 806, a persistent storage 808, a communications unit 810, an input/output (I/O) unit 812 and a display 814. In one specific embodiment, the data processing system 800 may be a personal computer (PC) or other computer architecture in connection with a monitor, keyboard, mouse and perhaps other peripheral devices. In another specific embodiment, the data processing system may be a firewall 104, for example, as shown in FIG. 1.

Processor unit 804 may serve to execute instructions (for example, a software program) that may be loaded into memory 806. Processor unit 804 may be a set of one or more processors or may be a multiprocessor core depending on the particular implementation. Further, processor unit 804 may be implemented using one or more heterogeneous processor systems in which a main processor is present with secondary processors on a single chip. As another illustrative example, processor unit 804 may be a symmetric multi-processor system containing multiple processors of the same type.

Memory 806 in these examples may be, for example, a random access memory or any other suitable volatile or non-volatile storage device.

Persistent storage 808 may take various forms depending on the particular implementation. For example, persistent storage 808 may contain one or more components or devices. For example, persistent storage 808 may be a hard drive, a flash memory, a rewritable optical disk, a rewritable magnetic tape or some combination of the above. The media used by persistent storage 808 also may be removable. For example a removable hard drive may be used.

Instructions for an operating system may be located on persistent storage 808. In one specific embodiment, the operating system may be some version of a number of known operating systems. Instructions for applications and/or programs may also be located on persistent storage 808. These instructions may be loaded into memory 806 for execution by processor unit 804. For example, the processes of the different embodiments described in this disclosure may be performed by processor unit 804 using computer implemented instructions which may be loaded into a memory such as memory 806. These instructions are referred to as program code, computer usable program code or computer readable program code that may be read and executed by a processor in processor unit 804. The program code in the different embodiments may be embodied on different physical or tangible computer readable media such as memory 806, persistent storage 808 and/or other computer readable media, for example as part of a CD or DVD.

Instructions for applications and/or programs may be located on a computer readable media 818 that is not permanently included in the data processing system 800. For example, program code 816 may be located in a functional form on computer readable media 818 and may be loaded into or transferred to data processing system 800 for execution by processor unit 804. Program code 816 and computer readable media 818 may form computer program product 820. In one example, computer readable media 818 may be in a tangible form such as, for example, an optical or magnetic disc that is inserted or placed into a drive or other device, for transfer onto a storage device such as a hard drive that is part of persistent storage 808. The drive or other device may be connected to and in communication with other components of the data processing system 800, for example, via the communications fabric 802 or via the input/output unit 812. In another tangible form, computer readable media 818 may be a persistent storage such as a hard drive or a flash memory that is connected to data processing system 800.

For the purposes of this disclosure a computer usable or computer readable medium can generally be any tangible apparatus that can contain, store, communicate, propagate or transport the data (such as a software program) for use by or in connection with a system, for example one that executes instructions. The computer usable or computer readable medium can be for example without limitation an electronic magnetic optical electromagnetic infrared or semiconductor system or a propagation medium. Non-limiting examples of a computer readable medium include a semiconductor or solid state memory magnetic tape, a removable computer diskette, a random access memory (RAM), a read only memory (ROM), a rigid magnetic disk and an optical disk. Optical disks may include compact disk read only memory (CD ROM), compact disk read write (CD R/W) and DVD. Further, a computer usable or computer readable medium may contain or store a computer readable or usable program code such that when the computer readable or usable program code is executed on a computer the execution of this computer readable or usable program code causes the computer to execute specified routines, procedures, steps and the like. The tangible form of computer readable media is also referred to as computer recordable storage media.

Display 814 may provide a mechanism to display information to a user, for example via a CRT, LCD or LED monitor, LED lights, or other type of display.

Input/output (I/O) unit 812 allows for input and output of data with other devices that may be connected to data processing system 800. For example, input/output unit 812 may provide a connection for user input through a keyboard, touch screen, mouse, and/or other pointing devices. Further, input/output unit 812 may send output to a printer. Input/output devices can be coupled to the system either directly or through intervening I/O controllers. Different communication adapters may also be coupled to the system to enable the data processing system to become coupled to other data processing systems or remote printers or storage devices through intervening private or public networks. Non-limiting examples such as modems and network adapters are just a few of the currently available types of communications adapters. Program code 816 may be transferred to data processing system 800 from computer readable media 818 through a connection to input/output unit 812. The connection may be physical or wireless in the illustrative examples. The computer readable media also may take the form of non-tangible media such as communications links or wireless transmissions containing the program code.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. For example, a bus system may be used to implement communications fabric 802 and may be comprised of one or more buses such as a system bus or an input/output bus. The bus system may be implemented using any suitable type of architecture that provides for a transfer of data between different components or devices attached to the bus system. Additionally a communications unit may include one or more devices used to transmit and receive data such as a modem or a network adapter. Further a memory may be, for example, memory 806 and/or a cache such as those found in an interface and memory controller hub that may be present in communications fabric 802.

Communications unit 810 may provide for communications with other data processing systems or devices. In these examples, communications unit 810 may be a network interface card (NIC). Communications unit 810 may provide communications through the use of either or both physical and/or wireless communications links Communications unit 810 may allow for input and of data. Communications unit 810 may facilitate capture of data (e.g., packets, headers, etc.) or transfer of data from another device.

The computer readable media also may take the form of non-tangible media such as communications links or wireless transmissions containing the program code.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A computer implemented method, comprising:
executing, on one or more computers, a routine that receives as input a plurality of pieces of packet information from outgoing network traffic, the outgoing network traffic being transmitted from one or more network devices of an internal network and intended for one or more external network devices outside the internal network;
executing, on the one or more computers, a routine that analyzes the pieces of packet information to identify outgoing network packets that receive no response packet during a period of time, wherein an outgoing network packet comprises a network packet sent from an internal network device to initiate a network connection with an external network device, the external network device comprising a computing device configured to take control of the internal network device that sent the outgoing network packet;
executing, on the one or more computers, a routine that causes storage and/or tracking, in a tracked connection list, of packet information related to the outgoing network packets that have received no response packet, the packet information comprising packet headers that have been normalized such that identical packet headers that are received within a period of time are grouped together;
iteratively determining whether an entry exists in the tracked connection list that comprises normalized header information that is reversed compared to header information of an immediate packet, wherein normalized header information that is reversed represents a destination Internet Protocol (IP) address to a source IP address connection;
determining that the immediate packet is a response packet for a connection that was previously stored in the tracked connection list in response to header information of the immediate packet and header information of a stored packet matching in a reversed manner; and
removing the packet or header information associated with the response packet from the tracked connection list in response to the response packet comprising data indicating that the response packet contains a substantive response; and
wherein the steps of receiving, analyzing, causing, determining, and removing are performed by one or more processors operably coupled to a memory of the one or more computers.

2. The computer implemented method of claim 1, wherein the step of analyzing the pieces of packet information to identify outgoing network packets that receive no response packet during a period of time includes analyzing the pieces of packet information to identify outgoing network packets that are Dead-SYN packets.

3. The computer implemented method of claim 1, further comprising: executing, on the one or more computers, a routine that analyzes packet information, from the one or more data stores, to determine whether anomalies exist in the network traffic; and generating one or more events based on the determination of whether anomalies exist in the network traffic, the one or more events indicating that malware may exist in a network or on a device.

4. The computer implemented method of claim 3, wherein the step of determining whether anomalies exist in the network traffic includes detecting anomalies that are indicative of Advanced Persistent Threats (APTs).

5. The computer implemented method of claim 3, wherein the step of analyzing packet information from the one or more data stores to determine whether anomalies exist in the network traffic includes analyzing packet information to determine whether a particular source device has generated multiple outgoing network packets that received no response packet.

6. The computer implemented method of claim 3, further comprising:

executing, on the one or more computers, a routine that receives as input, from one or more data stores, a group of packet information that includes multiple pieces of packet information, wherein each of the pieces of packet information is associated with a network packet and includes a source and a destination of the associated packet and a time indication, and wherein the step of analyzing packet information from the one or more data stores to determine whether anomalies exist in the network traffic includes:

analyzing the group of packet information to determine a number of pieces of packet information in the group with the same source and destination; and determining whether the number of pieces of packet information with the same source and destination exceeds a threshold.

7. The computer implemented method of claim 6, wherein the number of pieces of packet information included in the group is determined by comparing a time period configuration to the time indication of each piece of packet information such that a number of pieces of packet information are received over determined a period of time.

8. The computer implemented method of claim 3, wherein the step of analyzing packet information from the one or more data stores to determine whether anomalies exist in the network traffic includes analyzing packet information to determine whether multiple source devices have been infected with the same malware.

9. The computer implemented method of claim 3, further comprising:

executing, on the one or more computers, a routine that receives as input, from one or more data stores, a group of packet information that includes multiple pieces of packet information, wherein each of the pieces of packet information is associated with a network packet and includes a source and a destination of the associated packet and a time indication, and wherein the step of analyzing packet information from the one or more data stores to determine whether anomalies exist in the network traffic includes:

analyzing the group of packet information to determine, for each destination, a number of pieces of packet information in the group for each unique source; and determining whether the number of pieces of packet information with each unique source, for a single destination, exceeds a threshold.

10. The computer implemented method of claim 3, wherein the step of analyzing packet information from the one or more data stores to determine whether anomalies exist in the network traffic includes analyzing packet information to determine whether a source device is attempting to communicate with multiple destinations.

11. The computer implemented method of claim 3, further comprising:

executing, on the one or more computers, a routine that receives as input, from one or more data stores, a group of packet information that includes multiple pieces of packet information, wherein each of the pieces of packet information is associated with a network packet and includes a source and a destination of the associated packet and a time indication, and wherein the step of analyzing packet information from the one or more data stores to determine whether anomalies exist in the network traffic includes:

analyzing the group of packet information to determine, for each source, a number of pieces of packet information in the group for each unique destination; and determining whether the number of pieces of packet information with each unique destination, for a single source, exceeds a threshold.

12. The computer implemented method of claim 3, wherein the step of analyzing packet information from the one or more data stores to determine whether anomalies exist in the network traffic includes analyzing packet information to determine whether a particular source device is attempting to communicate with a particular destination on a reoccurring basis.

13. The computer implemented method of claim 3, further comprising:

executing, on the one or more computers, a routine that receives as input, from one or more data stores, a group of packet information that includes multiple pieces of packet information, wherein each of the pieces of packet information is associated with a network packet and includes a source and a destination of the associated packet and a time indication, wherein each of the pieces of packet information in the group has the same source and destination, and wherein the step of analyzing packet information from the one or more data stores to determine whether anomalies exist in the network traffic includes:

analyzing the group of packet information to determine, for each destination, a number of pieces of packet information in the group; and determining whether the number of pieces of packet information, for a single destination, exceeds a threshold.

14. The computer implemented method of claim 3, wherein the step of analyzing packet information from the one or more data stores to determine whether anomalies exist in the network traffic includes analyzing packet information to determine whether a particular source device is attempting to communicate with a particular destination an average number of times over a time period that is about the same as averages over previous time periods.

15. The computer implemented method of claim 13, wherein the step of analyzing packet information from the one or more data stores to determine whether anomalies exist in the network traffic further includes:

determining, for the single destination, an average number of pieces of packet information in the group with the single destination per source;

comparing the average number to a previous average number of a previous group of packet information; and determining whether the average number and the previous average number are about the same.

16. The computer implemented method of claim 13, wherein the number of pieces of packet information included in the group is determined by comparing a time period configuration to the time indication of each piece of packet information such that a number of pieces of packet information are received over determined a period of time.

17. The computer implemented method of claim 3, wherein the step of analyzing packet information from the one or more data stores to determine whether anomalies exist in the network traffic includes analyzing packet information to determine whether a particular source device is generated repeating clusters of outgoing network packets that received no response packet.

18. The computer implemented method of claim 3, further comprising:

executing, on the one or more computers, a routine that receives as input, from one or more data stores, a group of packet information that includes multiple pieces of packet information, wherein each of the pieces of packet information is associated with a network packet and includes a source and a destination of the associated packet and a time indication, wherein the step of analyzing packet information from the one or more data stores to determine whether anomalies exist in the network traffic includes:

analyzing the group of packet information and, for each source, forming packet clusters for pieces of packet information having time indications that are relatively close to each other; and determining whether the time between the packet clusters is repeating.

19. The computer implemented method of claim 3, wherein the step of analyzing packet information from the one or more data stores to determine whether anomalies exist in the network traffic includes analyzing packet information to determine whether a particular source device is attempting to communicate with a particular destination in repeating clusters.

20. The computer implemented method of claim 3, further comprising:

executing, on the one or more computers, a routine that receives as input, from one or more data stores, a group of packet information that includes multiple pieces of packet information, wherein each of the pieces of packet information is associated with a network packet and includes a source and a destination of the associated packet and a time indication, wherein the step of analyzing packet information from the one or more data stores to determine whether anomalies exist in the network traffic includes:

analyzing the group of packet information and, for each source/destination pair, forming packet clusters for pieces of packet information having time indications that are relatively close to each other; and determining whether the time between the packet clusters is repeating.

21. A data processing system, comprising:

one or more communications units that are in communication with one or more networks;

one or more memory units that store computer code; and one or more processor units coupled to the one or more communications units and the one or more memory units, wherein the one or more processor units execute the computer code stored in the one or more memory units to adapt the data processing system to:

receive as input a plurality of pieces of packet information from outgoing network traffic, the outgoing network traffic being transmitted from one or more network devices of an internal network and intended for one or more external network devices outside the internal network;

analyze the pieces of packet information to identify outgoing network packets that receive no response packet during a period of time, wherein an outgoing network packet is identified in response to the outgoing network packet comprising an initial communication network packet sent from an internal network device to establish a network connection with an external network device, the external network device comprising an attacker-controlled server configured to take control of the internal network device that sent the outgoing network packet and instruct the internal network device to perform an action for the attacker;

cause storage and/or tracking, in a tracked connection list, of packet information related to the outgoing network packets that have received no response packet, the packet information comprising packet headers that have been normalized such that identical packet headers that are received within a period of time are grouped together;

iteratively determine whether an entry exists in the tracked connection list that comprises normalized header information that is reversed compared to header information of an immediate packet, wherein normalized header information that is reversed represents a destination Internet Protocol (IP) address to a source IP address connection;

determine that the immediate packet is a response packet for a connection that was previously stored in the tracked connection list in response to header information of the immediate packet and header information of a stored packet matching in a reversed manner; and remove the packet or header information associated with the response packet from the tracked connection list in response to the response packet comprising data indicating that the response packet contains a substantive response.

22. The data processing system of claim 21, wherein the one or more processor units execute the computer code stored in the one or more memory units to adapt the data processing system to:

analyze packet information, from the one or more data stores, to determine whether anomalies exist in the network traffic; and generate one or more events based on the determination of whether anomalies exist in the network traffic, the one or more events indicating that malware may exist in a network or on a device.

23. The data processing system of claim 22, wherein the data processing system is a firewall.

* * * * *